United States Patent
Fakoorian et al.

(10) Patent No.: US 11,968,051 B2
(45) Date of Patent: Apr. 23, 2024

(54) MULTIPLEXING UPLINK CONTROL INFORMATION (UCI) WITH MIXED PRIORITIES FOR A PHYSICAL UPLINK CONTROL CHANNEL (PUCCH)

(71) Applicant: Apple Inc., Cupertino, CA (US)

(72) Inventors: Seyed Ali Akbar Fakoorian, San Diego, CA (US); Yushu Zhang, Beijing (CN); Huaning Niu, San Jose, CA (US); Haitong Sun, Cupertino, CA (US); Hong He, Sunnyvale, CA (US); Sigen Ye, Whitehouse Station, NJ (US); Wei Zeng, Saratoga, CA (US); Dawei Zhang, Saratoga, CA (US); Oghenekome Oteri, San Diego, CA (US); Chunxuan Ye, San Diego, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,247

(22) PCT Filed: Apr. 2, 2021

(86) PCT No.: PCT/CN2021/085310
§ 371 (c)(1),
(2) Date: Sep. 20, 2021

(87) PCT Pub. No.: WO2022/205425
PCT Pub. Date: Oct. 6, 2022

(65) Prior Publication Data
US 2024/0048288 A1 Feb. 8, 2024

(51) Int. Cl.
*H04L 1/1829* (2023.01)
*H04W 72/21* (2023.01)
*H04W 72/56* (2023.01)

(52) U.S. Cl.
CPC .......... *H04L 1/1854* (2013.01); *H04W 72/21* (2023.01); *H04W 72/56* (2023.01)

(58) Field of Classification Search
CPC ...... H04L 1/1854; H04W 72/56; H04W 72/21
See application file for complete search history.

(56) References Cited

U.S. PATENT DOCUMENTS

| 2011/0164707 A1 | 7/2011 | Luo et al. |
| 2011/0269490 A1 | 11/2011 | Earnshaw et al. |

(Continued)

FOREIGN PATENT DOCUMENTS

| WO | WO 2011/137177 A1 | 11/2011 |
| WO | WO 2019/192447 A1 | 10/2019 |

OTHER PUBLICATIONS

International Search Report and Written Opinion of the International Searching Authority directed to related International Patent Application No. PCT/CN2021/085310, dated Jan. 4, 2022; 8 pages.

(Continued)

*Primary Examiner* — Justin Y Lee
(74) *Attorney, Agent, or Firm* — Sterne, Kessler, Goldstein & Fox P.L.L.C.

(57) ABSTRACT

Some aspects of this disclosure relate to apparatuses and methods for implementing techniques for a user equipment (UE) to multiplex a first HARQ of a first priority and a second HARQ of a second priority to form an initial UCI payload. The UE can select a PUCCH resource accordingly to a PUCCH configuration, and generate a second UCI payload by removing or replacing at least a portion of the initial UCI payload when a size of the initial UCI payload is larger than a size of the PUCCH resource. The UE can encode at least a part of the second UCI payload including the first HARQ to generate an error correction code word. Afterwards, the UE can add the error correction code word to the second UCI payload to generate a transmission UCI (Continued)

payload, and transmit the transmission UCI payload to the base station.

20 Claims, 14 Drawing Sheets

(56) References Cited

U.S. PATENT DOCUMENTS

| | | | |
|---|---|---|---|
| 2013/0170443 A1 | 7/2013 | He et al. | |
| 2023/0354404 A1* | 11/2023 | Li | H04W 72/563 |
| 2023/0379917 A1* | 11/2023 | Yin | H04W 72/21 |
| 2023/0379962 A1* | 11/2023 | Andersson | H04W 72/21 |

OTHER PUBLICATIONS

Apple Inc., 3GPP TSG RAN WG1 #103-e, "Discussion on Intra-UE Multiplexing/Prioritization," R1-2008463, Nov. 13, 2020, 4 pages.

* cited by examiner

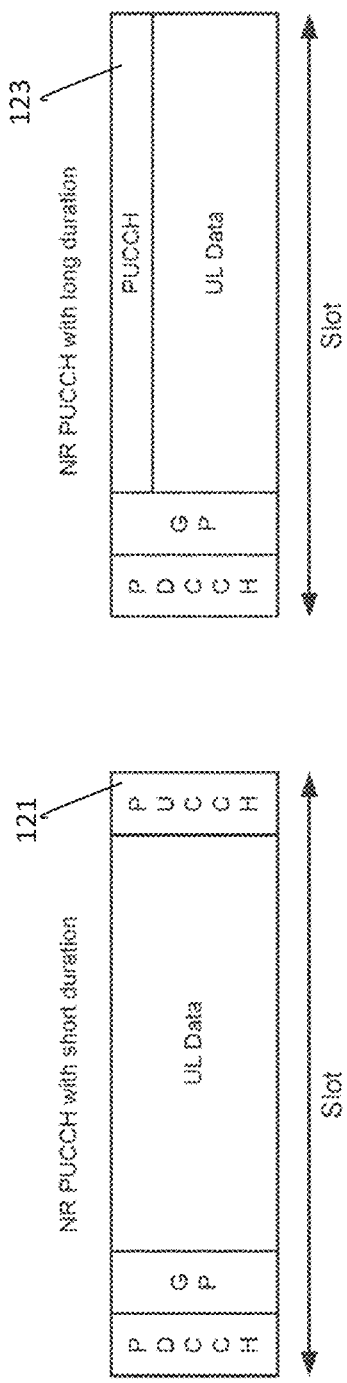
FIG. 1B
FIG. 1C
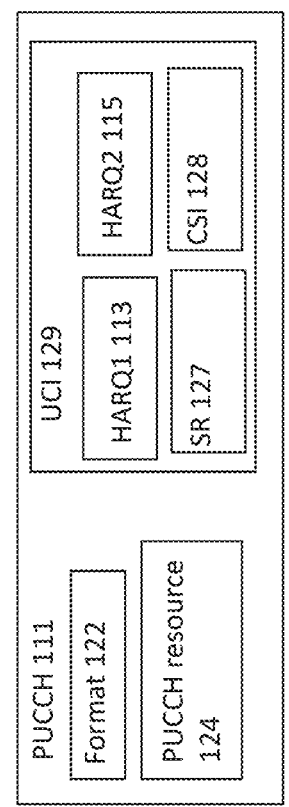

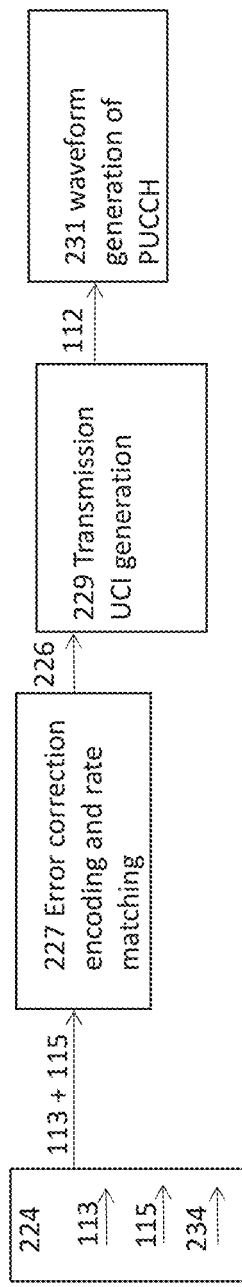
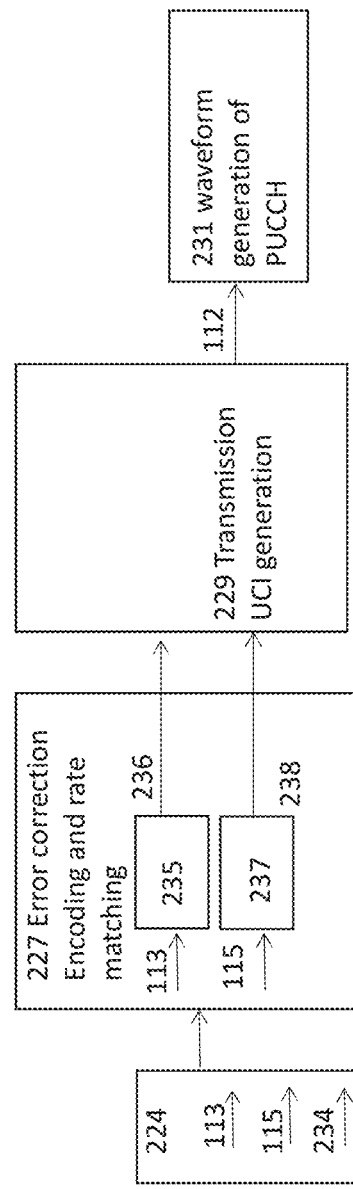

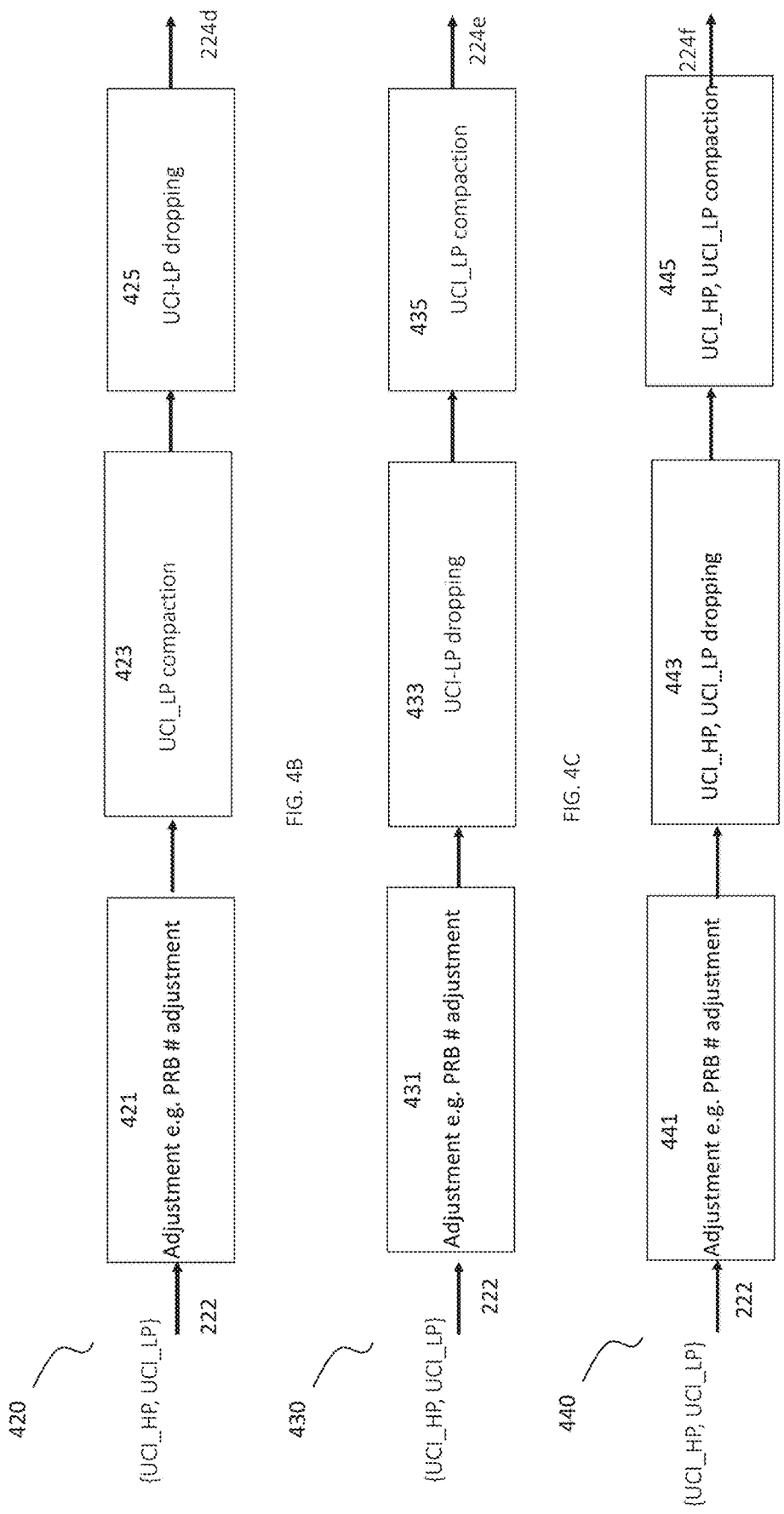

MULTIPLEXING UPLINK CONTROL INFORMATION (UCI) WITH MIXED PRIORITIES FOR A PHYSICAL UPLINK CONTROL CHANNEL (PUCCH)

This application is a U.S. National Phase of International Application No. PCT/CN2021/085310, filed Apr. 2, 2021, which is hereby incorporated by reference in its entirety.

BACKGROUND

Field

The described aspects generally relate to multiplexing uplink control information (UCI) with mixed priorities for a physical uplink control channel (PUCCH).

Related Art

The 3rd Generation Partnership Project (3GPP) has developed a new radio-access technology known as fifth generation (5G) New Radio (NR) wireless systems. Physical uplink control channel (PUCCH) is an uplink physical channel that carries uplink control information (UCI) from a user equipment (UE) to a base station in a wireless system. 5G NR PUCCH is flexible in time domain and frequency domain. A UCI may include various types of information such as a scheduling request (SR), a Hybrid Automatic Repeat reQuest (HARQ) acknowledgement/non-acknowledgement (ACK/NACK) signal, a channel quality indicator (CQI), a precoding matrix indicator (PMI), a rank indicator (RI), and the like. Efficient and reliable transmission of UCI for various applications is important and desired for wireless systems.

SUMMARY

Some aspects of this disclosure relate to apparatuses and methods for implementing techniques for a user equipment (UE) to multiplex various uplink control information (UCI) parts of mixed priorities on a physical uplink control channel (PUCCH) resource for uplink transmission from the UE to a base station. The implemented techniques can be applicable to many wireless systems, e.g., a wireless communication system based on 3rd Generation Partnership Project (3GPP) release 15 (Rel-15), release 16 (Rel-16), release 17 (Rel-17), or others. A UCI payload can include a first Hybrid Automatic Repeat reQuest Acknowledgement (HARQ-ACK, or HARQ in short) of a first priority, a second HARQ of a second priority, and optionally multiplexed with other UCI components. The UCI payload including multiplexed UCI components can be transmitted over a PUCCH resource, where the first HARQ of the first priority and the second HARQ of the second priority can be encoded jointly or separately. When a size of the UCI payload is larger than a size of the PUCCH resource, operations can be performed on the UCI payload including multiplexed UCI components, which may be referred to as an initial UCI payload, to generate a transmission UCI payload of a smaller size to fit into the PUCCH resource. The transmission UCI payload can be generated from the initial UCI payload by removing or replacing at least a portion of the initial UCI payload to generate a second UCI payload, and further adding some error correction code word generated based on the second UCI payload.

Some aspects of this disclosure relate to a UE. The UE can include a transceiver configured to enable wireless communication with a base station, and a processor communicatively coupled to the transceiver. The processor of the UE is configured to multiplex a first HARQ of a first priority and a second HARQ of a second priority to form an initial UCI payload. In addition, the processor is configured to select a PUCCH resource accordingly to a PUCCH configuration. When a size of the initial UCI payload is larger than a size of the PUCCH resource, a second UCI payload can be generated by removing or replacing at least a portion of the initial UCI payload. On the other hand, when the size of the initial UCI payload is smaller than or equal to the size of the PUCCH resource, the second UCI payload can be the same as the initial UCI payload. The processor is further configured to encode at least a part of the second UCI payload including the first HARQ of the first priority to generate an error correction code word. Afterwards, the processor is configured to add the error correction code word to the second UCI payload to generate a transmission UCI payload. The processor is further configured to transmit, using the transceiver, the transmission UCI payload to the base station.

In some examples, the encoded part of the second UCI payload further includes the second HARQ of the second priority, where the first HARQ of the first priority and the second HARQ of the second priority can be encoded jointly. In some other examples, the first HARQ of the first priority and the second HARQ of the second priority can be encoded separately.

According to some aspects, the PUCCH resource can include a PUCCH_ResourceSet triggered by a dynamic grant, a multi-CSI-PUCCH-ResourceList, a pucch-CSI-ResourceList, or some other PUCCH resources. The first HARQ of the first priority can include a high priority (HP) dynamic grant (DG) HARQ, a HP semi-persistent scheduling (SPS) HARQ for a current slot, or a HP SPS HARQ for a deferred slot. In addition, the second HARQ of the second priority can include a low priority (LP) DG HARQ, a LP SPS HARQ for the current slot, or a LP SPS HARQ for the deferred slot. In some examples, the UCI component can include a channel state information (CSI), a scheduling request (SR), a high priority (HP) CSI, a HP persistent or semi-persistent (P/SP) CSI, a HP SR, a low priority (LP) CSI, a LP P/SP CSI, a LP SR, CSI part 1, or CSI part 2.

According to some aspects, when the size of the initial UCI payload is larger than the size of the PUCCH resource, the second UCI payload can be generated by removing a UCI component of the initial UCI payload, removing a HARQ part for a component carrier, or removing a HARQ part of a lower priority while retaining a HARQ part of a higher priority. The second UCI payload can be generated according to a pre-determined rule or a rule configured based on a configuration from the base station.

In some examples, to generate the second UCI payload, the processor is configured to remove a DG HARQ before removing a deferred SPS HARQ, and to remove the deferred SPS HARQ before removing a current SPS HARQ. In some other examples, to generate the second UCI payload, the processor is configured to remove a deferred SPS HARQ before removing a DG HARQ, and to remove the DG HARQ before removing a current SPS HARQ.

In some examples, to generate the second UCI payload, the processor is configured to replace a codeblock group (CBG) based HARQ by a transport block (TB) based HARQ. In some other examples, to generate the second UCI payload, the processor is configured to adjust the size of the PUCCH resource according to the size of the initial UCI payload.

Some aspects of this disclosure relate to a method performed by a UE. The method includes multiplexing a first HARQ of a first priority, a second HARQ of a second priority, and at least a UCI component to form an initial UCI payload. The method further includes selecting a PUCCH resource accordingly to a PUCCH configuration. In addition, the method includes generating a second UCI payload based on the initial UCI payload by removing or replacing at least a portion of the initial UCI payload when a size of the initial UCI payload is larger than a payload size of the PUCCH resource. Afterwards, the method includes encoding at least a part of the second UCI payload including the first HARQ of the first priority to generate an error correction code word, and adding the error correction code word to the second UCI payload to generate a transmission UCI payload. Furthermore, the method includes transmitting the transmission UCI payload to a base station.

Some aspects of this disclosure relate to non-transitory computer-readable medium storing instructions. When executed by a processor of a UE, the instructions stored in the non-transitory computer-readable medium cause the UE to perform various operations. The operations include multiplexing a first HARQ of a first priority, a second HARQ of a second priority, and at least a UCI component to form an initial UCI payload. The operations further include selecting a PUCCH resource accordingly to a PUCCH configuration. In addition, the operations include generating a second UCI payload based on the initial UCI payload by removing or replacing at least a portion of the initial UCI payload when a size of the initial UCI payload is larger than a size of the PUCCH resource. Afterwards, the operations include encoding at least a part of the second UCI payload including the first HARQ of the first priority to generate an error correction code word, and adding the error correction code word to the second UCI payload to generate a transmission UCI payload. Furthermore, the operations include transmitting the transmission UCI payload to a base station.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIGS. 1A-1C illustrate a wireless system including a user equipment (UE) to multiplex various uplink control information (UCI) parts of mixed priorities on a physical uplink control channel (PUCCH) resource for uplink transmission, according to some aspects of the disclosure.

FIGS. 2A-2J illustrate a block diagram of a UE to perform functions described herein, according to some aspects of the disclosure.

FIGS. 4A-4E illustrate example methods performed by a UE to reduce an initial UCI payload to fit a payload size of a PUCCH resource for uplink transmission, according to some aspects of the disclosure.

Figure 1A:
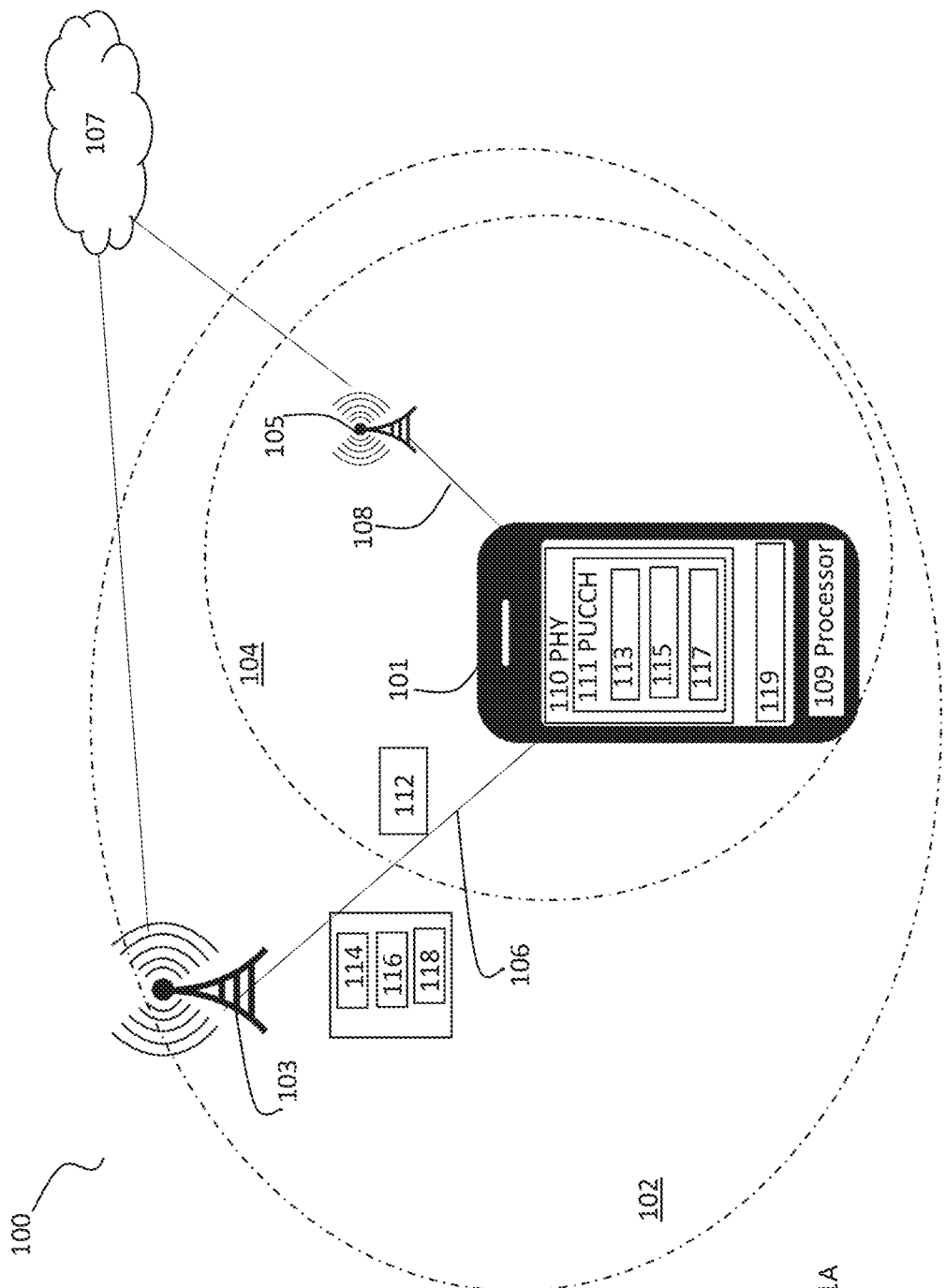

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In a wireless system, e.g., a fifth generation (5G) New Radio (NR) system, a physical uplink control channel (PUCCH) can be used to carry uplink control information (UCI) from a user equipment (UE) to a base station. A UCI can include a scheduling request (SR), a hybrid automatic repeat request-acknowledgement (HARQ-ACK) feedback, a channel state information (CSI) report, e.g., channel quality indicator (CQI), pre-coding matrix indicator (PMI), CSI resource indicator (CRI), rank indicator (RI), beam related information such as layer 1-reference signal received power (L1-RSRP), or more. Hybrid ARQ or HARQ is a combination of high-rate forward error correction (FEC) and automatic repeat request (ARQ). In the description below, a HARQ can be used to refer to either a HARQ-ACK, or a non-acknowledgement (HARQ-NACK). In addition, a UCI can have an associated priority, e.g., a high priority (HP) or a low priority (LP). For example, a UCI can be a HP HARQ, or a LP HARQ. Other UCI components, e.g., SR, CSI, can have different priorities associated with them as well. The associated priority of a UCI component can facilitate a better control of the UCI transmission for various applications. The HP and LP are used as examples only. In some embodiments, there can be different kinds of priorities, e.g., high priority, medium priority, low priority, or some other enumerated priorities.

Multiple UCI components with associated priorities can be multiplexed and transmitted together to a base station through a PUCCH resource. However, simply multiplexing the various UCI parts together can cause problems. For example, some CSI reports can have a large size, and may not fit into a PUCCH resource configured according to a configuration from the base station. Therefore, mechanisms are needed to provide solutions to improve the efficiency as well as reliability for UCI transmission.

Embodiments herein provide example solutions for a UE to multiplex multiple UCI components of mixed priorities on a PUCCH resource for uplink transmission from the UE to a base station. A UCI payload may include a first HARQ of a first priority, a second HARQ of a second priority, optionally multiplexed with other UCI components. The multiplexed UCI payload can be transmitted over a PUCCH resource, where the first HARQ of the first priority and the second HARQ of the second priority can be encoded jointly or separately. When a size of the UCI payload is larger than a size of the PUCCH resource, operations can be performed on the UCI payload including multiplexed UCI components, which may be referred to as an initial UCI payload, to generate a transmission UCI payload of a smaller size to fit into the PUCCH resource. The transmission UCI payload can be generated from the initial UCI payload by removing or replacing at least a portion of the initial UCI payload to generate a second UCI payload, and further adding some error correction code word generated based on the second UCI payload.

FIGS. 1A-1C illustrate a wireless system 100 including a UE, e.g., UE 101, to multiplex various UCI components of mixed priorities on a PUCCH resource for uplink transmission, according to some aspects of the disclosure. FIGS. 2A-2D illustrate a block diagram of a UE, e.g., UE 101, to perform functions described herein. Wireless system 100 is provided for the purpose of illustration only and does not limit the disclosed aspects. Wireless system 100 can include, but is not limited to, UE 101, a base station 103, and a base station 105, all communicatively coupled to a core network 107. UE 101 communicates with base station 103 over a carrier 106, and communicates with base station 105 over a carrier 108.

In some examples, wireless system 100 can be a NR system, a LTE system, a 5G system, or some other wireless system. Even though many examples are described herein in the context of a NR system, wireless system 100 is not limited to a NR system. Instead, wireless system can be any wireless system where a UE multiplexes various UCI components of mixed priorities on a PUCCH resource for uplink transmission, or performs other functions described in this disclosure. There can be other network entities, e.g., network controller, a relay station, in wireless system 100 that are not shown, but will be understood by those skilled in the art. Wireless system 100 can support a wide range of use cases such as enhanced mobile broad band (eMBB), massive machine type communications (mMTC), ultra-reliable and low-latency communications (URLLC), and enhanced vehicle to anything communications (eV2X).

According to some aspects, base station 103 and base station 105 can be a fixed station or a mobile station. Base station 103 and base station 105 can also be called other names, such as a base transceiver system (BTS), an access point (AP), a transmission/reception point (TRP), an evolved NodeB (eNB), a next generation node B (gNB), a 5G node B (NB), or other equivalent terminology as will be understood by those skilled in art. In some examples, base station 103 and base station 105 can be interconnected to one another and/or to other base stations or network nodes in a network through various types of backhaul interfaces such as a direct physical connection, wireless connection, a virtual network, and/or the like.

According to some aspects, UE 101 can be stationary or mobile. UE 101 can be a cellular phone (e.g., a smart phone), a personal digital assistant (PDA), a wireless modem, a wireless communication device, a handheld device, a laptop, a desktop, a cordless phone, a wireless local loop station, a tablet, a camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, base station 103 and base station 105 can be communicatively coupled to core network 107. Base station 103 can serve a cell 102, while base station 105 can serve a cell 104 contained within cell 102. In some other embodiments, cell 102 can overlap partially with cell 104. Cell 102 or cell 104 can be a macro cell, a pico cell, a femto cell, and/or another type of cell. In comparison, a macro cell can cover a relatively large geographic area, e.g., several kilometers in radius, a femto cell can cover a relatively small geographic area, e.g., a home, while a pico cell covers an area smaller than the area covered by a macro cell but larger than the area covered by a femto cell. For example, cell 102 can be a macro cell, while cell 104 can be a pico cell or a femto cell. In addition, cell 102 can be a pico cell and cell 104 can be a femto cell. In some examples, the geographic area of a cell can move according to the location of a mobile base station.

According to some aspects, base station 103 can be the serving base station and cell 102 can be the serving cell or primary cell. Cell 104 can be a secondary cell. There can be other secondary cells for UE 101, not shown. Data for UE 101 can be simultaneously transferred between UE 101 and core network 107 by a radio connection between UE 101 and base station 103 at one carrier frequency (component carrier, e.g., carrier 106), and/or one or more radio connections between UE 101 and base station 105 at different carrier frequencies (component carriers, e.g., carrier 108).

According to some aspects, carrier 106 or carrier 108 can be established using a single-input and single-output (SISO), multiple-input and single-output (MISO), single-input and multiple-output (SIMO), or a multiple-input and multiple-output (MIMO) system. A MIMO system may include both a transmitter and a receiver equipped with multiple transmit and receive antennas.

According to some aspects, UE 101 can receive data 118 or other control information from base station 103. For example, UE 101 can receive a PUCCH configuration 114 to configure a PUCCH resource for UCI transmission, a configuration 116 to configure a rule to reduce the size of multiplexed UCI component, or data 118. UE 101 can include a decoder 119 to decode received data or control information from base station 103. The decoding results of decoder 119 can indicate whether data or control information has been received correctly, which can generate positive acknowledgement, negative acknowledgement or discontinuous transmission (no signal).

According to some aspects, UE 101 can include a processor 109 to operate a protocol stack including multiple protocol layers, e.g., a physical (PHY) layer 110, per the description provided herein. In detail, PHY 110 can include a PUCCH 111 configured to carry a transmission UCI payload 112 generated based on multiple UCI components, a first HARQ 113 with a first priority, a second HARQ 115 with a second priority, a UCI component 117. The first HARQ 113, the second HARQ 115, and the UCI component 117 can be multiplexed to form an initial UCI payload. In some embodiments, transmission UCI payload 112 can be generated by adding error correction code word to the initial UCI payload. In some other embodiments, transmission UCI payload 112 can be generated by performing various reduction operations such as removing or replacing at least a portion of the initial UCI payload, with more details shown in the descriptions below, e.g., FIG. 3.

According to some aspects, the first HARQ 113 of the first priority can include a HP dynamic grant (DG) HARQ, a HP semi-persistent scheduling (SPS) HARQ for a current slot, or a HP SPS HARQ for a deferred slot. The second HARQ 115 of the second priority can include a LP DG HARQ, a LP SPS HARQ for the current slot, or a LP SPS HARQ for the deferred slot.

According to some aspects, the UCI component 117 can include a CSI, a SR, a HP CSI, a HP persistent or semi-persistent (P/SP) CSI, a HP SR, a LP CSI, a LP P/SP CSI, a LP SR, CSI part 1, or CSI part 2. A CSI or CSI report can include a channel quality indicator (CQI), a pre-coding matrix indicator (PMI), CSI resource indicator (CRI), a rank indicator (RI), a beam related information such as layer 1-reference signal received power (L1-RSRP), a synchronization signal/physical broadcast channel (PBCH) block resource indicator (SSBRI), a layer indicator (LI), or a signal to interference plus noise ratio (SINR), or other CSI parameters.

In some examples, as shown in FIG. 1B, PUCCH 111 can be a short PUCCH, e.g., PUCCH 121, or a long PUCCH, e.g., PUCCH 123. Furthermore, PUCCH 111 can be in various formats. Short PUCCH 121 can be of PUCCH format (PF) 0 and 2 that occupies 1 or 2 orthogonal frequency-division multiplexing (OFDM) symbols. Long PUCCH 123 can be of PUCCH format 1, 3 and 4 that occupies 4 to 14 OFDM symbols. PUCCH format 0 and 1 can carry UCI payloads having 1 or 2 bits. Other PUCCH formats can carry UCI payloads having more than 2 bits. Short PUCCH, e.g., PUCCH format 0 and 2, can span 1 or 2 symbols, while a long PUCCH, e.g., PUCCH format 1, 3 and 4, can span from 4 to 14 symbols within a slot. Further, a long PUCCH can span multiple slots to further enhance the coverage.

In some examples, as shown in FIG. 1C, PUCCH 111 can include UCI 129, a format 122 for which PUCCH 111 is transmitted, a PUCCH resource 124 for transmitting UCI 129. PUCCH resource 124 can be configured based on PUCCH configuration 114 received from base station 103. Format 122 can be any of the PUCCH formats, e.g., format 0, 1, 2, 3, 4. UCI 129 can include the first HARQ 113 of the first priority, the second HARQ 115 of the second priority, a SR 127, or a CSI 128. In some examples, the first priority can be HP and the second priority can be LP. In some other examples, the first priority can be LP and the second priority can be HP. In some other examples, there can be more than two different priorities, e.g., high priority, medium priority, and low priority. SR 127 or CSI 128 can be examples of the UCI component 117. SR 127 can be a SR, a HP SR, or a LP SR. CSI 128 can be a CSI, a HP CSI, a HP P/SP CSI, a LP CSI, a LP P/SP CSI, CSI part 1, or CSI part 2. A CSI report can include a CQI, a PMI, a CRI, a RI, a L1-RSRP, or other CSI parameters.

Figure 2A:
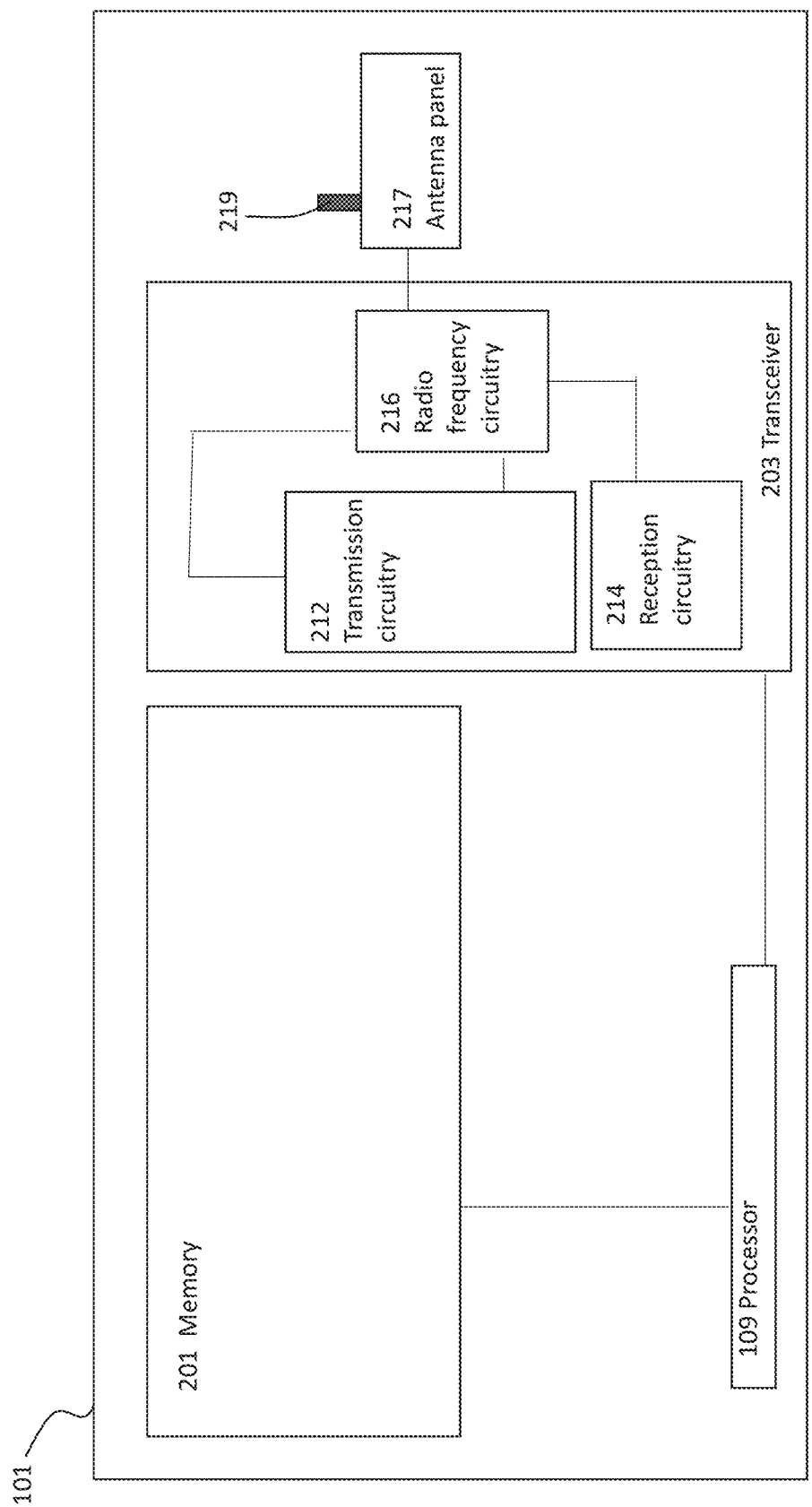

FIG. 2A illustrates a block diagram of UE 101, having antenna panel 217 including one or more antenna elements, e.g., an antenna element 219 coupled to transceiver 203 and controlled by processor 109. In detail, transceiver 203 can include radio frequency (RF) circuitry 216, transmission circuitry 212, and reception circuitry 214. RF circuitry 216 can include multiple parallel RF chains for one or more of transmit or receive functions, each connected to one or more antenna elements of the antenna panel. In addition, processor 109 can be communicatively coupled to a memory device 201, which are further coupled to the transceiver 203. The memory device can include instructions, that when executed by the processor 109 perform the functions described herein. Alternatively, the processor 109 can be "hard-coded" to perform the functions described herein.

Figure 2B:
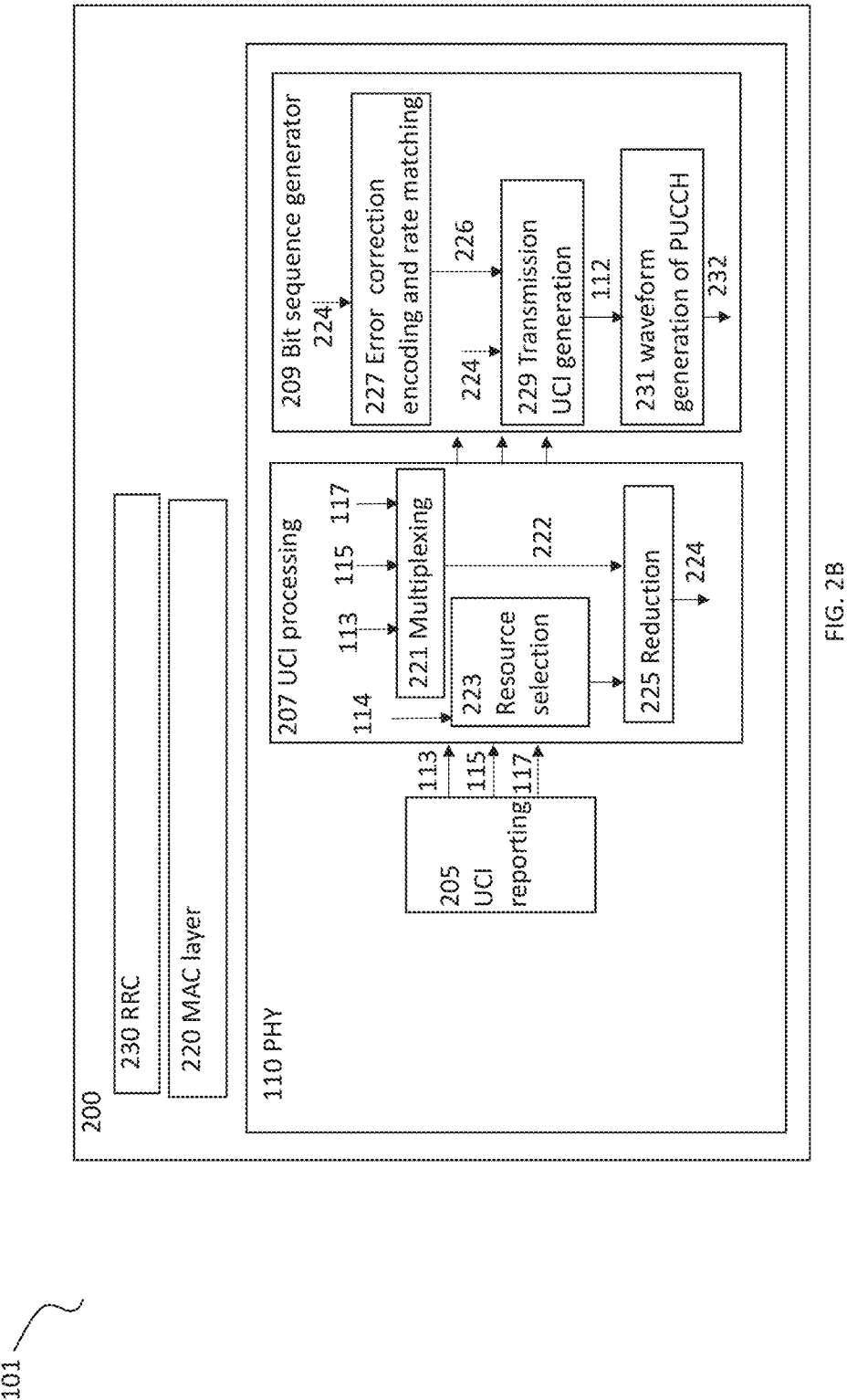

FIG. 2B illustrates a communications protocol stack 200 that can be implemented by processor 109 according to various embodiments of the disclosure. Protocol stack 200 includes physical layer 110, MAC layer 220, and radio resource control (RRC) layer 230. PHY layer 110 includes a UCI reporting 205, a UCI processing 207, and a bit sequence generator 209. UCI reporting 205 can measure and report various UCI components, e.g., the first HARQ 113, the second HARQ 115, and the UCI component 117, which are transferred to UCI processing 207.

According to some aspects, UCI processing 207 can include a multiplexing 221, a resource selection 223, and a reduction 225. Multiplexing 221 can receive the first HARQ 113, the second HARQ 115, and the UCI component 117, and generate an initial UCI payload 222 by multiplexing the first HARQ 113, the second HARQ 115, and the UCI component 117 together. Resource selection 223 can select a PUCCH resource accordingly to a PUCCH configuration, e.g., PUCCH configuration 114. The selected PUCCH resource can include a PUCCH_ResourceSet triggered by a dynamic grant, a multi-CSI-PUCCH-ResourceList, a pucch-CSI-ResourceList, or some other PUCCH resources.

According to some aspects, reduction 225 can generate a second UCI payload 224 based on initial UCI payload 222. When the size of the initial UCI payload 222 is smaller than or equal to the payload size of the PUCCH resource selected by resource selection 223, the second UCI payload 224 can be the same as the initial UCI payload 222. On the other hand, when a size of the initial UCI payload 222 is larger than a size of the PUCCH resource selected by resource selection 223, the second UCI payload 224 can be generated by removing or replacing at least a portion of the initial UCI payload 222. There are various ways to remove or replace at least a portion of the initial UCI payload 222.

According to some aspects, to generate the second UCI payload 224, processor 109 can be configured to remove or replace at least a portion of the initial UCI payload 222 according to a pre-determined rule or a rule configured based on a configuration from the base station, e.g., configuration 116.

According to some aspects, to generate the second UCI payload 224, processor 109 can be configured to remove a UCI component of the initial UCI payload 222 when the size of the initial UCI payload 222 is larger than the size of the PUCCH resource, remove a HARQ part for a component carrier, or remove a HARQ part of a lower priority while retaining a HARQ part of a higher priority.

According to some aspects, to generate the second UCI payload 224, processor 109 can be configured to remove SPS HARQ before removing DG HARQ; or to remove a DG HARQ before removing a deferred SPS HARQ, and to remove the deferred SPS HARQ before removing a current SPS HARQ; or to remove a deferred SPS HARQ before removing a DG HARQ, and to remove the DG HARQ before removing a current SPS HARQ.

According to some aspects, to generate the second UCI payload 224, processor 109 can be configured replace a codeblock group (CBG) based HARQ by a transport block (TB) based HARQ.

According to some aspects, to generate the second UCI payload 224, processor 109 can be configured to adjust the size of the PUCCH resource according to the size of the initial UCI payload.

According to some aspects, the second UCI payload 224 can be transferred to bit sequence generator 209. Bit sequence generator 209 can include an error correction encoding and rate matching 227, a transmission UCI generation 229, and waveform generation of PUCCH 231. Error correction encoding and rate matching 227 can receive the second UCI payload 224, encode at least a part of the second UCI payload 224 to generate an error correction code word 226. Transmission UCI generation 229 can receive error correction code word 226, and add error correction code word 226 to the second UCI payload 224 to generate transmission UCI payload 112. Furthermore, waveform generation of PUCCH 231 can map transmission UCI payload 112 and DMRS to locations in PUCCH resource or alternatively first spread transmission UCI payload 112 with a spreading code and then map the resulted sequence along with DMRS to locations in PUCCH resource, wherein the mapping may involve performing DFT or IDFT once or more, and. The mapping may involve frequency hopping to produce an output 232. Output 232 can be transmitted by HP transceiver 203 to base station 103. Other operations, e.g., rate matching, can be performed by transmission circuitry. UE 101 can transmit transmission UCI payload 112 to base station 103 on an uplink, carrier 106.

According to some aspects, error correction encoding and rate matching 227 can generate error correction code word 226 for the second UCI payload 224 in various ways. For example, the first HARQ 113 and the second HARQ 115 included in the second UCI payload 224 can be encoded jointly as shown in FIG. 2C, or encoded separately as shown in FIGS. 2D-2J. According to some aspects, joint encoding as shown in FIG. 2C has the advantage of smaller specification/implementation change. On the other hand, separate encoding as shown in FIGS. 2D-2J can give differential treatment to HP HARQ and LP HARQ. Joint encoding or separate encoding can be applied to different applications depending on the needs of the applications.

According to some aspects, as shown in FIG. 2C, the second UCI payload 224 can include the first HARQ 113, the second HARQ 115, and the UCI component 234. The bits of the first HARQ 113 and the bits of the second HARQ 115 can be concatenated to generate a bit stream 113+115 as a combination of the bits of the first HARQ 113 and the bits of the second HARQ 115. Afterwards, the concatenated bit streams 113+115 are fed into error correction encoding and rate matching 227 to generate error correction code word 226. Portions or all of the UCI component 234 is fed into error correction encoding and rate matching 227 to generate error correction code word 226. Error correction code word 226 can be generated by CRC and polar code or RM code. In this case, the first HARQ 113, the second HARQ 115 are joint-coded.

More examples of the first HARQ 113, the second HARQ 115 being joint-coded are shown in Table 1 below. The first column of Table 1 shows the content of the second UCI payload 224. The second column of Table 1 shows the second UCI payload 224 is joint-coded as one group. One exception is when the CSI has two parts, CSI part 1 and CSI part 2, where the second UCI payload 224 is still coded separately. The third column of Table 1 shows the length of the error correction code generated.

TABLE 1

| the second UCI payload 224 | UCI encoding group | Bit length |
|---|---|---|
| HARQ-ACK, SR | HP HARQ-ACK, HP SR, LP HARQ-ACK | $E_{UCI} = E_{tot}$ |
| HARQ-ACK, SR, CSI (CSI is at HP) | HP HARQ-ACK, HP SR, HP CSI, LP HARQ-ACK | $E_{UCI} = E_{tot}$ |
| HARQ-ACK, SR, CSI (CSI part 1 & 2) | HP HARQ-ACK, HP SR, CSI part 1 | $E_{UCI,part1} = \min(E_{tot}, [(O^{H-ACK} + O^{H-SR} + O^{CSI-part1} + L)/R_{UCI}^{max}/Q_m] \cdot Q_m)$ |
|  | LP HARQ-ACK, (LP SR), CSI part 2 | $E_{UCI,part2} = E_{tot} - E_{UCI,part1}$ |

As shown in Table 1, when LP-HARQ-ACK is added to other HP UCI information bits, the coding rate can be high, e.g. larger than 1. Hence UCI compaction behavior including CSI omission and LP HARQ-ACK compaction behavior can be triggered with joint encoding. If all CSI reports are at low physical priority, CSI omission can precede HARQ-ACK compaction behavior, in another word when the first UCI payload is too large, CSI reports/CSI part/CSI parts are omitted first in total or in part. If after omitting a CSI part or all CSI parts, the remaining UCI payload is still too large, then HARQ-ACK compaction behavior is triggered. If HP HARQ or LP HARQ includes multiple parts (e.g. DG HARQ from the current UL slot, SPS HARQ deferral at HP and LP respectively), discarding/compaction rules can be applied by reduction 225 as shown in FIG. 2B to generate the second UCI payload 224 where not all UCIs can be accommodated. If the condition below is met, then compaction on LP-ACK is triggered so that $O^{L-ACK} \rightarrow O_{new}^{L-ACK}$. Note some items may not be present for some feedback combination:

$$[(O^{H-ACK}+O^{H-SR}+O^{H-CSI-part1}+O^{L-ACK}+L)/R_{UCI}^{max}/Q_m] \cdot Q_m) > E_{tot}$$

According to some aspects, as shown in FIG. 2D, the second UCI payload 224 can include the first HARQ 113, the second HARQ 115, and an optional UCI component 234. UCI component 234 can include a CSI, a SR, a HP CSI, a HP persistent or semi-persistent (P/SP) CSI, a HP SR, a LP CSI, a LP P/SP CSI, a LP SR, CSI part 1, or CSI part 2. A CSI report can include a CQI, a PMI, a CRI, a RI, a L1-RSRP, or other CSI parameters. Error correction encoding and rate matching 227 can include a first coder 235 and a second coder 237. The bits of the first HARQ 113 can be fed into the first coder 235 to generate an error correction code word 236, and the bits of the second HARQ 115 can be fed into the second coder 237 to generate an error correction code word 238. Portions of the UCI component 234 can be fed into the first coder 235 or the second coder 237 as well. Error correction code words 236 and 238 can be generated by cyclic redundancy code (CRC), polar code, or Reed-Muller (RM) code or combination thereof implemented by coders 235 and 237 to generate error correction code words 236 and 238.

TABLE 2

| the second UCI payload 224 | UCI encoding groups | Bit length |
|---|---|---|
| HARQ-ACK, SR | HP HARQ-ACK, HP SR | $E_{UCI} = \min(E_{tot}, [(O^{H-ACK} + O^{H-SR} + L)/R_{UCI}^{max}/Q_m] \cdot Q_m)$ |
|  | LP HARQ-ACK, (LP SR) | $E_{UCI} = E_{tot} - \min(E_{tot}, [(O^{H-ACK} + O^{H-SR} + L)/R_{UCI}^{max}/Q_m] \cdot Q_m)$ |
| HARQ-ACK, SR, CSI (CSI is at HP) | HP HARQ-ACK, HP SR, (HP CSI) | $E_{UCI} = \min(E_{tot}, [(O^{H-ACK} + O^{H-SR} + O^{H-CSI} + L)/R_{UCI}^{max}/Q_m] \cdot Q_m)$ |
|  | LP HARQ-ACK, (LP SR) | $E_{UCI} = \min(E_{tot}, [(O^{H-ACK} + O^{H-SR} + L)/R_{UCI}^{max}/Q_m] \cdot Q_m)$ |
| HARQ-ACK, SR, CSI (CSI part 1 & 2) | HP HARQ-ACK, HP SR, CSI part 1 | $E_{UCI} = \min(E_{tot}, [(O^{H-ACK} + O^{H-SR} + O^{H-CSI} + L)/R_{UCI}^{max}/Q_m] \cdot Q_m)$ |
|  | LP HARQ-ACK, (LP SR), CSI part 2 | $E_{UCI} = E_{tot} - \min(E_{tot}, [(O^{H-ACK} + O^{H-SR} + O^{H-CSI-part1} + L)/R_{UCI}^{max}/Q_m] \cdot Q_m)$ |
| HARQ-ACK, SR, CSI at LP, a single part | HP HARQ-ACK, HP SR | $E_{UCI} = \min(E_{tot}, [(O^{H-ACK} + O^{H-SR} + L)/R_{UCI}^{max}/Q_m] \cdot Q_m)$ |
|  | LP HARQ-ACK, (LP SR), (LP CSI) | $E_{UCI} = E_{tot} - \min(E_{tot}, [(O^{H-ACK} + O^{H-SR} + L)/R_{UCI}^{max}/Q_m] \cdot Q_m)$ |
| HARQ-ACK, SR, CSI (Some CSI is at HP, some CSI is at LP), all CSIs are of a single part | HP HARQ-ACK, HP HARQ, HP SR | $E_{UCI} = \min(E_{tot}, [(O^{H-ACK} + O^{H-SR} + O^{H-CSI} + L)/R_{UCI}^{max}/Q_m] \cdot Q_m)$ |
|  | LP HARQ-ACK, (LP SR), (LP CSI) | $E_{UCI} = E_{tot} - \min(E_{tot}, [(O^{H-ACK} + O^{H-SR} + O^{H-CSI} + L)/R_{UCI}^{max}/Q_m] \cdot Q_m)$ |

Code segmentation can be performed on the first HARQ 113 and/or the second HARQ 115 if certain conditions are met, for example with conditions as specified in Clause 6.3.1.2.1 in TS 38.212. Rate matching is also applied to code words 236 and 238 respectively. Hence, in embodiments, the first HARQ 113, the second HARQ 115 are encoded separately from each other. Afterwards, coded and rate-matched code words 236 and 238 are mapped to resources for respective UCI components in PUCCH (refer to Clause 6.3.1.6 of TS 38.212).

More examples of the first HARQ 113, the second HARQ 115 coded separately are shown in Table 2 above. The first column of Table 2 shows the content of the second UCI payload 224. The second column of Table 2 shows how to separate the second UCI payload 224 into two groups, one group including the first HARQ 113, e.g., HP HARQ-ACK, while the second group including the second HARQ 115, e.g., LP HARQ-ACK. The third column of Table 2 shows the length of the error correction code word generated. L is the length of CRC, which can be zero if the Reed-Muller code is used.

Figure 2F:
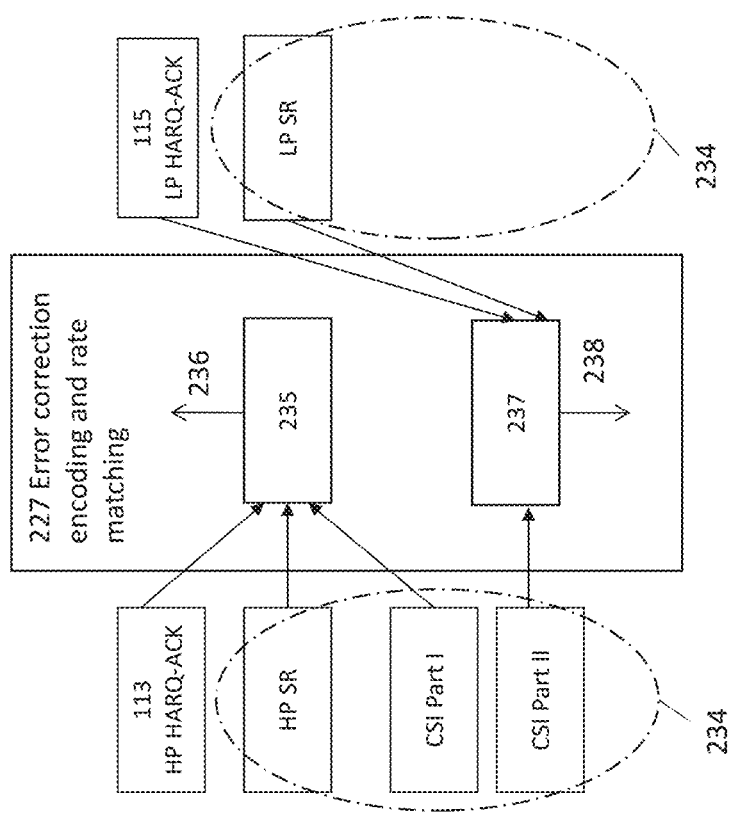
Figure 2E:
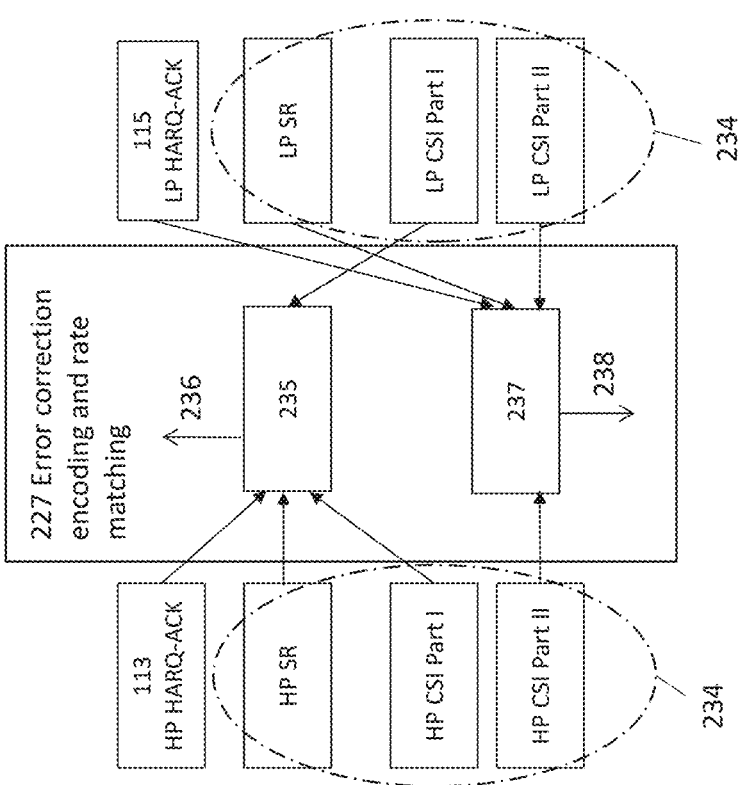
Figure 2H:
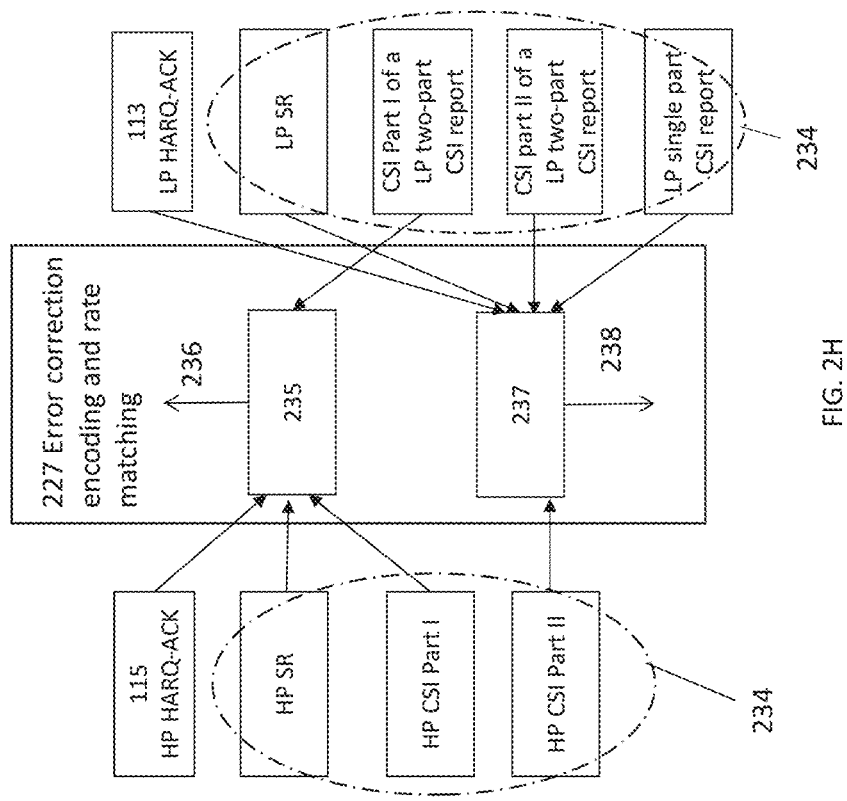
Figure 2G:
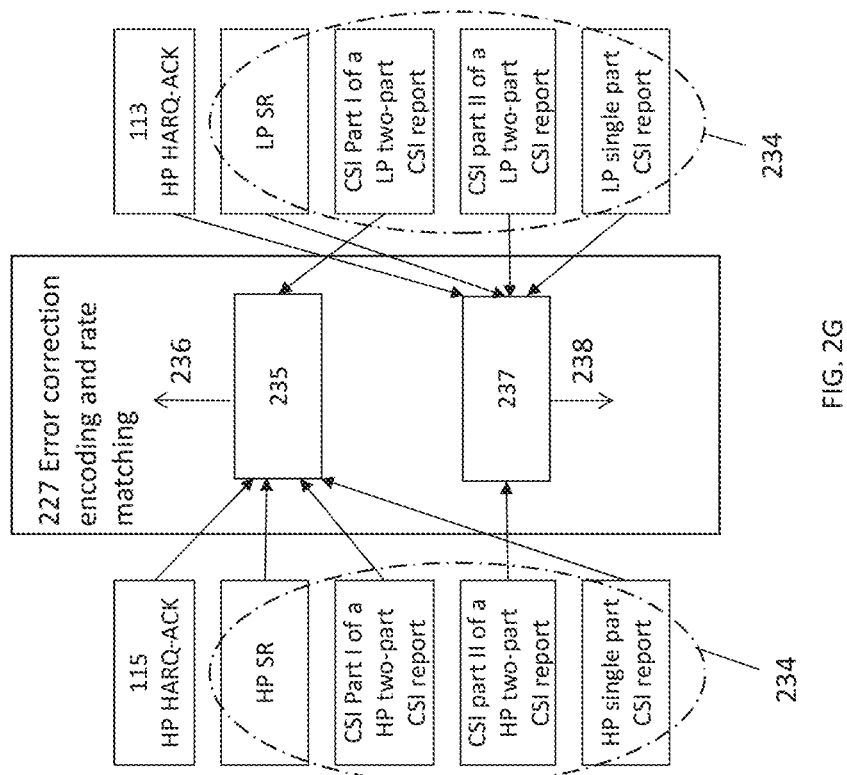
Figure 2I:
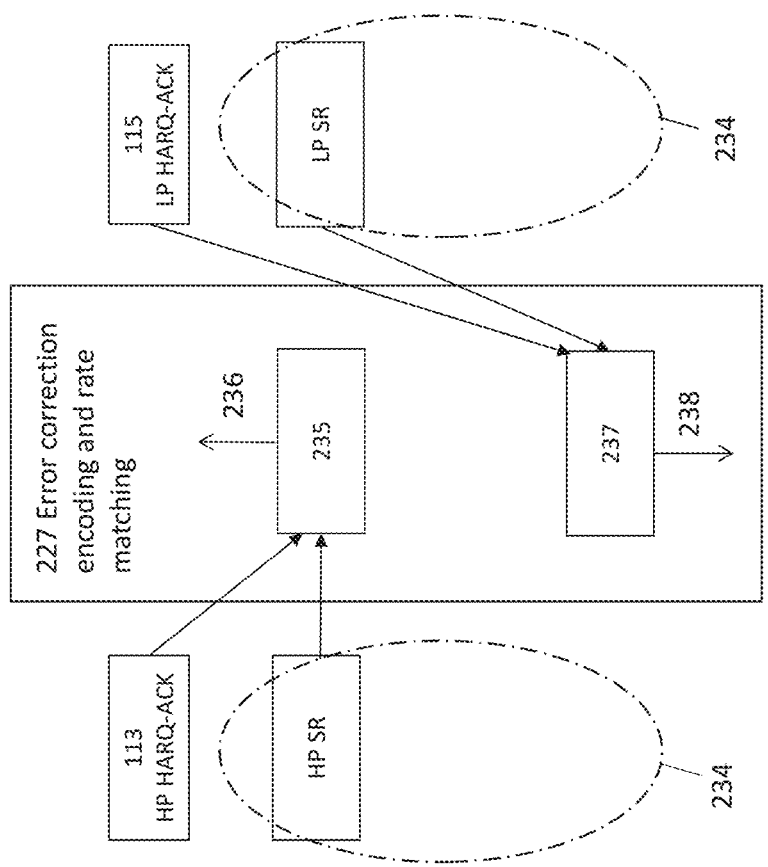
Figure 2J:
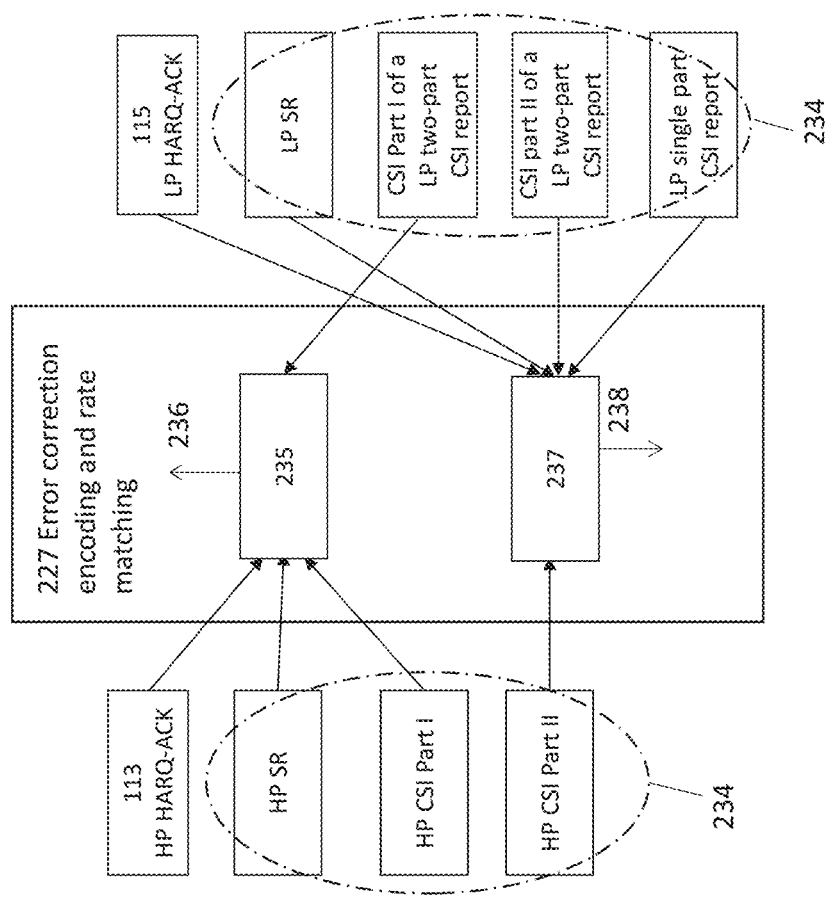

According to some aspects, as shown in FIGS. 2E-2J, the second UCI payload 224 can include the first HARQ 113 or the second HARQ 115, and various UCI components 234, as described above. Error correction encoding and rate matching 227 can include the first coder 235 and corresponding rate matching and the second coder 237 and corresponding rate matching. As shown in FIG. 2E, CSI part I and CSI part II in UCI 234 can each have high priority or low priority, which are encoded separately by the first coder 235 and the second coder 237. Likewise, SR can have high priority or low priority, which are also encoded separately as shown. As shown in FIG. 2F, CSI part I and CSI part II does not have priority, where CSI part I is encoded by the first coder 235 and CSI part II is encoded by the second coder 237. Different variations of CSI part I, CSI part IL, a single CSI report, with a high priority or a low priority, or without a priority, are shown in FIGS. 2G-2J. FIGS. 2E-2J are merely examples, there can be many other different ways for separate encoding of the first HARQ 113 and the second HARQ 115. Note joint encoding of HP HARQ and LP HARQ can be obtained from modifying Schemes illustrated in FIGS. 2E-2I by removing the connection from 113 or 115 (LP HARQ-ACK) to 237 and adding a connection from 113 or 115 (LP HARQ-ACK) to 235.

Figure 3:
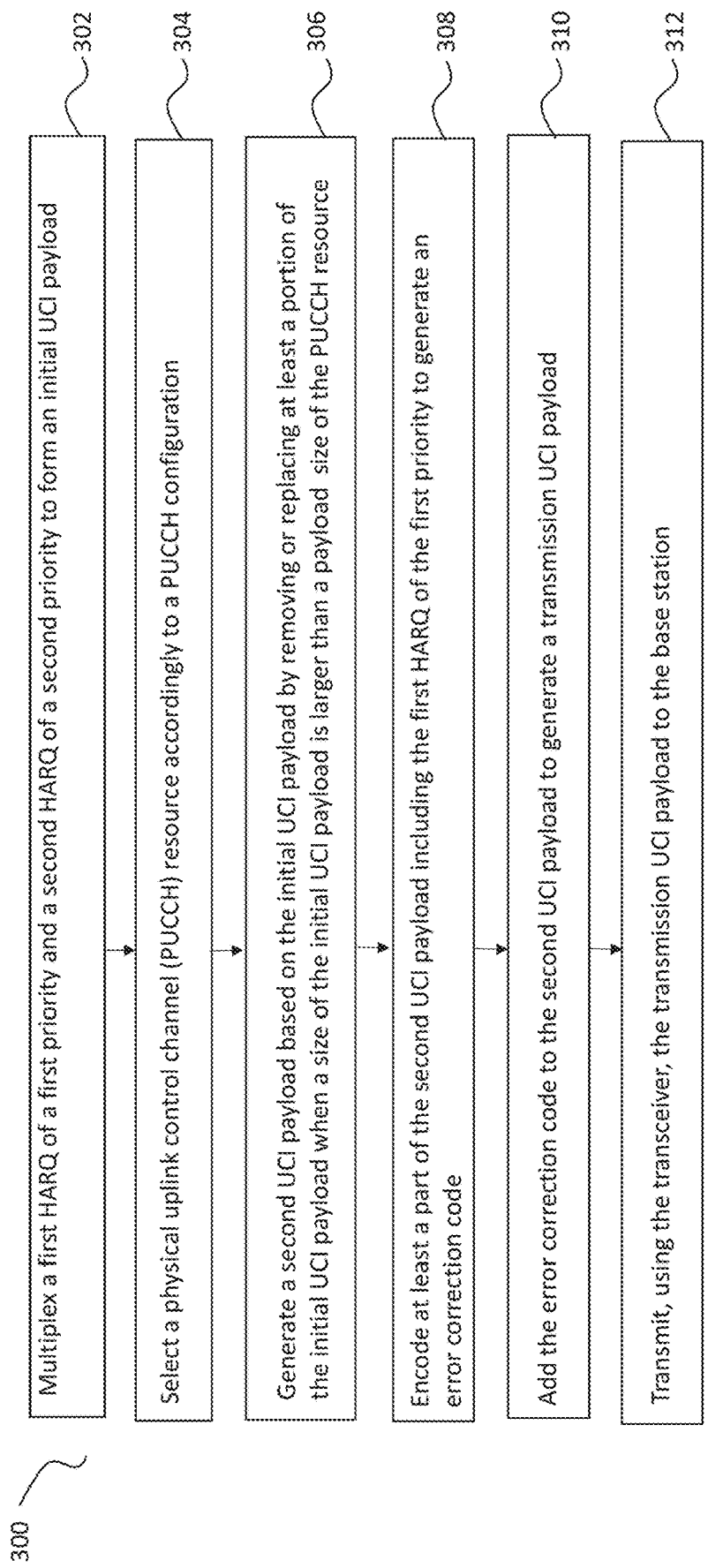
FIG. 3 illustrate an example method performed by a UE to multiplex various UCI components of mixed priorities on a PUCCH resource for uplink transmission, according to some aspects of the disclosure.

FIG. 3 illustrates an example method 300 performed by UE 101 to multiplex various UCI components of mixed priorities on a PUCCH resource for uplink transmission, according to some aspects of the disclosure. Method 300 can be performed by UE 101, as shown in FIGS. 1A-1C and 2A-2D. For example, processor 109 can perform method 300. Processor 109 can be "hard-coded" to perform method 300, or processor 109 can execute instructions stored in memory 201 to perform method 300.

At 302, UE 101 can multiplex a first HARQ of a first priority and a second HARQ of a second priority to form an initial UCI payload. For example, as shown in FIG. 2A, multiplexing 221 of UE 101 can multiplex the first HARQ 113 of the first priority, the second HARQ 115 of the second priority, and at least the UCI component 117 to form the initial UCI payload 222. UCI component 117 can include a CSI, a SR, a HP CSI, a HP persistent or semi-persistent (P/SP) CSI, a HP SR, a LP CSI, a LP P/SP CSI, a LP SR, CSI part 1, or CSI part 2. A CSI report can include a CQI, a PMI, a CRI, a RI, a L1-RSRP, or other CSI parameters.

At 304, UE 101 can select a PUCCH resource accordingly to a PUCCH configuration. For example, as shown in FIG. 2A, resource selection 223 of UE 101 can select a PUCCH resource accordingly to a PUCCH configuration, e.g., PUCCH configuration 114.

According to some aspects, the selected PUCCH resource can include a PUCCH_ResourceSet triggered by a dynamic grant, a multi-CSI-PUCCH-ResourceList, a pucch-CSI-ResourceList, or some other PUCCH resources. Detailed examples of resource selection performed by resource selection 223 are shown in Table 3 and Table 4 below.

In Table 3, columns 2-8 show the presence, by Yes or No, of various UCI components of initial UCI payload 222. Column 9 shows the PUCCH resource selected to transmit initial UCI payload 222. In Table 4, columns 2-9 show the presence, by Yes or No, of various UCI components of initial UCI payload 222. Column 10 shows the PUCCH resource selected to transmit initial UCI payload 222.

TABLE 3

|  | HP DG HARQ | HP SPS HARQ (current slot) | HP SPS HARQ (deferred) | LP DG HARQ | LP SPS HARQ (current slot) | LP SPS HARQ (deferred) | P/SP CSI | Selected resource | UCIs |
|---|---|---|---|---|---|---|---|---|---|
| Case 1 | Yes | * | * | * | * | * | * | HP PUCCH_ResourceSet | All UCIs except CSI(s) |
| Case 2 | No | Yes (at least one of them) | | Yes | * | * | * | HP PUCCH_ResourceSet (PRI selection), or HP SPS resource | All UCIs except CSI(s) |
| Case 3 | No | Yes (at least one of them) | | No | Yes (at least one of them) | | * | HP SPS HARQ resource (current) | All UCIs except CSI(s) |
| Case 4 | No | No | No | No | Yes (at least one of them) | | Yes | multi-CSI-PUCCH-ResourceList or pucch-CSI-ResourceList | All UCIS including CSI(s) |
| Case 5 | No | Yes | Yes | No | No | No | No | HP SPS HARQ resource (current) | All UCIs except CSI(s) |
| Case 6 | No | No | Yes | No | No | Yes | * | HP SPS HARQ resource (deferred) | Deferred HARQ at HP and LP |
| Case 7 | No | No | No | No | Yes | Yes | No | LP SPS HARQ resource (current) | |

TABLE 4

| | HP DG HARQ | HP SPS HARQ (current slot) | HP SPS HARQ (deferred) | LP DG HARQ | LP SPS HARQ (current slot) | LP SPS HARQ (deferred) | HP P/SP CSI | LP P/SP CSI | Selected resource | UCIs |
|---|---|---|---|---|---|---|---|---|---|---|
| Case 1 | Yes | * | * | * | * | * | * | * | HP PUCCH_ResourceSet | All UCIS not CSI(s) |
| Case 2 | No | Yes (at least one of them) | | Yes | * | * | * | * | HP PUCCH_ResourceSet (PRI selection), or HP SPS resource | All UCIs except CSI(s) |
| Case 3A | No | Yes (at least one of them) | | No | Yes (at least one of them) | | Yes | * | HP multi-CSI-PUCCH-ResourceList or pucch-CSI-ResourceList | All UCIs except CSI(s) |
| Case 3B | No | Yes (at least one of them) | | No | Yes (at least one of them) | | No | * | HP SPS HARQ resource (current) | All UCIS except CSI(s) |
| Case 4A | No | No | No | No | Yes (at least one of them) | | Yes | Yes | HP multi-CSI-PUCCH-ResourceList or pucch-CSI-ResourceList | All UCIs except LP CSI(s) |
| Case 4B | No | No | No | No | Yes (at least one of them) | | No | Yes | LP multi-CSI-PUCCH-ResourceList or pucch-CSI-ResourceList | All UCIs including CSI(s) |
| Case 5A | No | Yes | Yes | No | No | No | Yes | No | HP multi-CSI-PUCCH-ResourceList or pucch-CSI-ResourceList | All UCIs except LP CSI(s) |
| Case 5B | No | Yes | Yes | No | No | No | No | No | HP SPS HARQ resource (current) | All UCIs not CSI(s) |
| Case 6A | No | No | Yes | No | No | Yes | Yes | * | HP multi-CSI-PUCCH-ResourceList or pucch-CSI-ResourceList | Deferred HARQ at HP and LP, HP CSI(s) |
| Case 6B | No | No | Yes | No | No | Yes | No | * | HP SPS HARQ resource (deferred) | Deferred HARQ at HP and LP |
| Case 7A | No | No | No | No | Yes | Yes | Yes | No | HP multi-CSI-PUCCH-ResourceList or pucch-CSI-ResourceList | |
| Case 7B | No | No | No | No | Yes | Yes | No | No | LP SPS HARQ resource (current) | |

At 306, UE 101 can generate a second UCI payload based on the initial UCI payload by removing or replacing at least a portion of the initial UCI payload when a size of the initial UCI payload is larger than a size of the PUCCH resource. For example, reduction 225 implemented by processor 109 can generate the second UCI payload 224 based on the initial UCI payload 222 by removing or replacing at least a portion of the initial UCI payload 222 when a size of the initial UCI payload 222 is larger than a size of the PUCCH resource. Various reduction rules can be developed. For example, if one UCI type/part cannot be fit, discard it totally or partially. In addition, a base station can over-provision the PUCCH resource (for PUCCH format 2 or PUCCH format 3), and therefore relies on PRB number adjustment according to a UCI payload size by the UE for efficient resource utilization. Additional omission/compaction rule for HARQ codebooks are described below. More examples of detailed operations performed by reduction 225 are shown in FIGS. 4A-4E.

At 308, UE 101 can encode at least a part of the second UCI payload including the first HARQ of the first priority to generate an error correction code word. For example, error correction encoding and rate matching 227 implemented by the processor 109 of UE 101 can receive the second UCI payload 224, encode at least a part of the second UCI payload 224 to generate error correction code word 226.

At 310, UE 101 can add the error correction code word to the second UCI payload to generate a transmission UCI payload. For example, transmission UCI generation 229 implemented by processor 109 can receive error correction code word 226, and add error correction code word 226 to the second UCI payload 224 to generate transmission UCI payload 112.

At 312, UE 101 can transmit, using the transceiver, the transmission UCI payload to the base station. For example, processor 109 of the UE 101 can transmit, using the transceiver 203, transmission UCI payload 112 to base station 103 on an uplink, carrier 106.

FIGS. 4A-4E illustrate example methods, e.g., method 410, method 420, method 430, method 440, and method 450 performed by a UE to reduce an initial UCI payload to fit a payload size of a PUCCH resource for uplink transmission, according to some aspects of the disclosure. Method 410, method 420, method 430, method 440, and method 450 can be performed by reduction 225 implemented by processor 109 at operations 306 of method 300. In some examples, method 410, method 420, method 430, method 440, and method 450 can be detailed implementations of operations 306 of method 300.

Figure 4A:
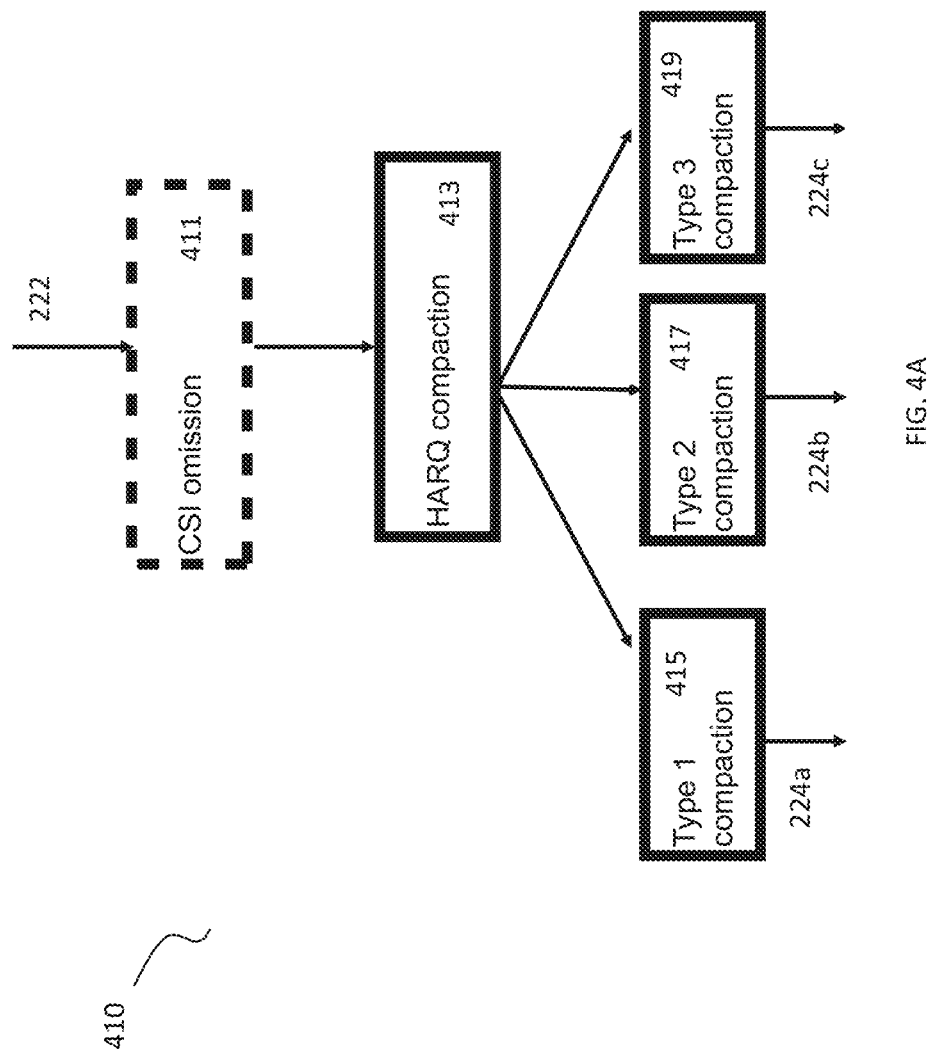

According to some aspects, FIG. 4A illustrates method 410 to reduce initial UCI payload 222 to generate the second UCI payload 224. At 411, reduction 225 implemented by processor 109 can receive the initial UCI payload 222 and discard CSI part 2 in part or totally. If not enough, reduction 225 can further discard CSI part 1 in part or totally.

At 413, reduction 225 implemented by processor 109 can further perform HARQ compaction operations.

At 415, reduction 225 implemented by processor 109 can perform type 1 compaction to generate the second UCI payload 224a. Operations performed at 415 can include: converting CBG based feedback to TB based feedback, spatial bundling, or discarding HARQ-ACK for some CCs, e.g. for higher-indexed cells.

At 417, reduction 225 implemented by processor 109 can perform type 2 compaction to generate the second UCI payload 224b. Operations performed at 417 can include: converting CBG based sub-codebook to another TB based codebook (protected already), or spatial bundling (protected already).

At 419, reduction 225 implemented by processor 109 can perform type 3 compaction to generate the second UCI payload 224c. Operations performed at 419 can include: converting CBG based feedback to TB based feedback, spatial bundling, or discarding HARQ-ACK for some CCs, e.g. for higher-indexed cells.

Various priority orders can be followed in discarding HARQ-ACK. For example, at HP, the following priority order of discarding HARQ-ACK can be followed: {DG triggered HARQ codebook (Type1/2/enhanced Type 3)>SPS deferral codebook>HARQ codebook Type 3} or {SPS deferral codebook>DG triggered HARQ codebook (Type1/2/3/enhanced Type 3)/HARQ codebook Type 3}. In addition, at LP, the following priority order of discarding HARQ-ACK can be followed: SPS deferral codebook>DG triggered HARQ codebook(s).

Reduction 225 can stop performing compaction operations 413 when some conditions are met. For example, for joint encoding, reduction 225 can stop performing compaction operations when the coding rate for the compacted payload+CRC does not exceed $R_{UCI}^{max}$. For separate encoding, reduction 225 can stop performing compaction operations when the coding rate for the 2nd part+CRC does not exceed the coding rate $R_{UCI,part2}^{max}$.

According to some aspects, FIG. 4B illustrates method 420 to reduce the initial UCI payload 222 to generate the second UCI payload 224d. Method 420 can be performed by reduction 225 implemented by processor 109. Method 420 can be performed when UCI multiplexing follows pre-determined rules.

At 421, reduction 225 implemented by processor 109 can determine the size of the PUCCH resource provisioned by base station 103, and can further adjust the size of the PUCCH resource according to the size of the initial UCI payload 222. UE can increase or maximize resource available based on UCI e.g. physical resource block (PRB) #adjustment. If not enough resources, at 423, UE 101 via reduction 225 implemented by processor 109 performs compaction on specific/all UCI_LP. If still not enough resources, at 425, UE 101 or reduction 225 drops specific/all UCI_LP.

According to some aspects, FIG. 4C illustrates method 430 to reduce the initial UCI payload 222 to generate the second UCI payload 224e. Method 430 can be performed by reduction 225 implemented by processor 109. Method 430 can be performed when UCI multiplexing follows pre-determined rules. Method 430 and method 420 differ in the order of compaction operations or dropping operations are performed. The compaction operations can replace parts of the initial UCI payload 222, while the dropping operations can discard parts of the initial UCI payload 222.

At 431, reduction 225 implemented by processor 109 can determine the size of the PUCCH resource provisioned by base station 103, and can further adjust the size of the PUCCH resource according to the size of initial UCI payload 222. UE can increase or maximize resource available based on UCI e.g. PRB #adjustment. If not enough resources, at 433, UE 101 via reduction 225 implemented by processor 109 drops specific/all UCI_LP. If still not enough resources, at 435, UE 101 via reduction 225 implemented by processor 109 performs compaction on specific/all UCI_LP.

According to some aspects, FIG. 4D illustrates method 440 to reduce the initial UCI payload 222 to generate the second UCI payload 224f. Method 440 can be performed by reduction 225 implemented by processor 109. Method 440 can be performed when UCI multiplexing uses RRC configuration from base station 103 to indicate preferred priority order and action. In method 430 and method 420, only LP UCI components are dropped or performed compaction. In method 440, both LP and HP UCI components can be dropped or performed compaction.

At 441, reduction 225 implemented by processor 109 can determine the size of the PUCCH resource provisioned by base station 103, and can further adjust the size of the PUCCH resource according to the size of initial UCI payload 222. UE can increase or maximize resource available based on UCI e.g. PRB #adjustment. If not enough resources, at 443, UE 101 via reduction 225 implemented by processor 109 drops configured UCI: UCI_HP, or UCI_LP. If still not enough resources, at 445, UE 101 or reduction 225 performs compaction on configured UCI: UCI_HP, or UCI_LP.

Various priority orders can be followed in dropping HARQ. For example, dropping rules can be as DG HARQ>deferred SPS HARQ>current SPS HARQ, or deferred SPS HARQ>DG HARQ>current SPS HARQ, etc.

Figure 4E:
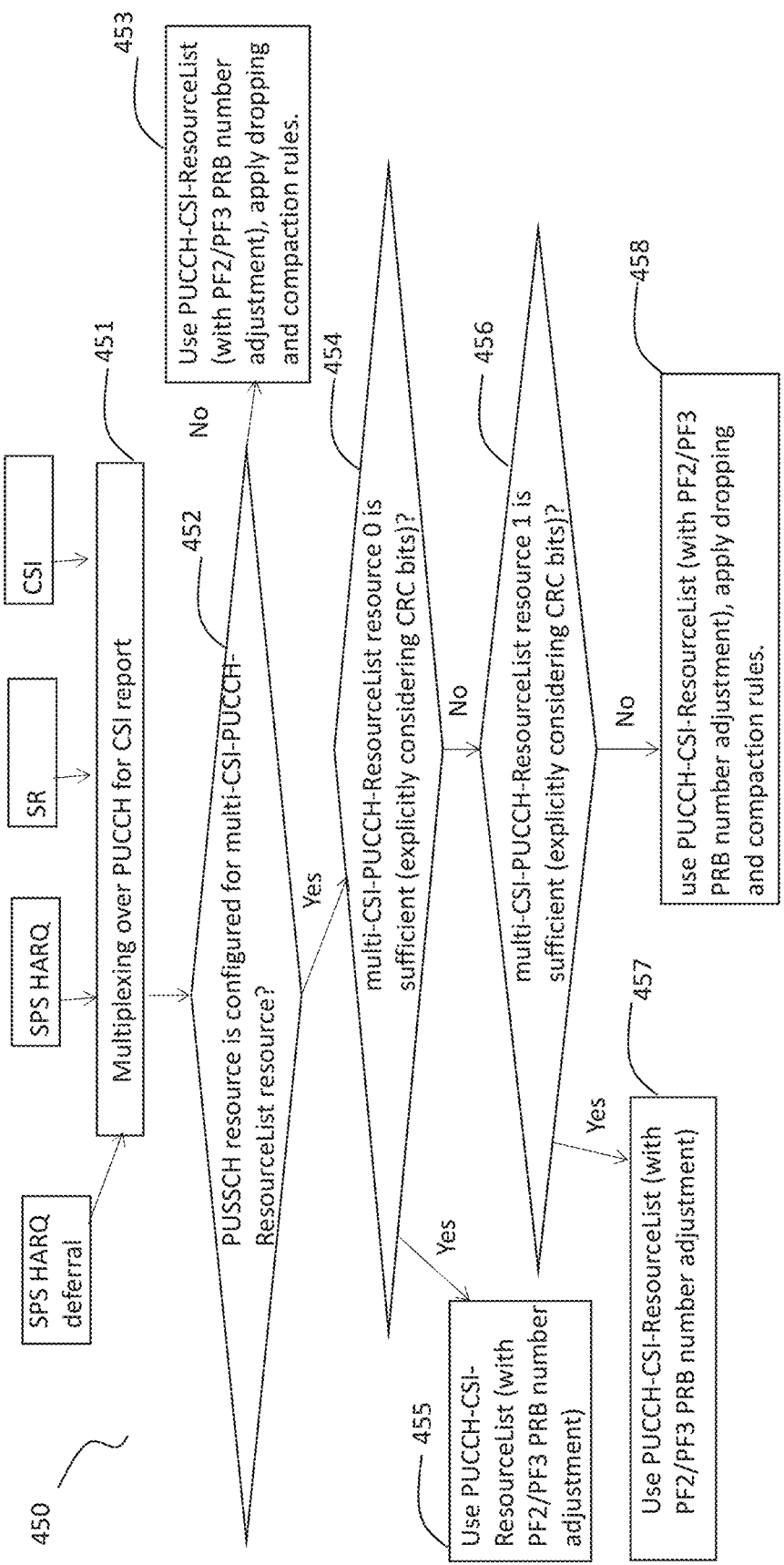

According to some aspects, FIG. 4E illustrates method 450 to reduce initial UCI payload 222 to generate the second UCI payload 224. Method 450 can be applied when SPS HARQs are involved. Some SPS HARQ can target URLLC traffic. HP SPS HARQ can be multiplexed with SR or CSI.

At 451, multiplexing 221 implemented by processor 109 can multiplex together multiple UCIs, including SPS HARQ deferral, SPS HARQ, SR and CSI to generate an initial UCI payload, e.g., the initial UCI payload 222. SPS HARQ deferral can be treated as a new input for UCI multiplexing.

At 452, resource selection 223 implemented by processor 109 can select a PUCCH resource accordingly to PUCCH configuration 114. Resource selection 223 can further determine whether the selected PUCCH resource is a multi-CSI-PUCCH-ResourceList resource or not. When resource selection 223 determines that the selected PUCCH resource is not a multi-CSI-PUCCH-ResourceList resource, resource selection 223 determines to use PUCCH-CSI-ResourceList (with PF2/PF3 PRB number adjustment) to carry the multiplexed SPS HARQ deferral, SPS HARQ, SR and CSI. At 453, reduction 225 implemented by processor 109 can apply various compacting rules and dropping rules as described in FIG. 3, FIGS. 4A-4D to generate a second UCI payload, e.g., the second UCI payload 224.

On the other hand, when resource selection 223 determines that the selected PUCCH resource is a multi-CSI-PUCCH-ResourceList resource, at 454, reduction 225 implemented by processor 109 can determine whether multi-CSI-PUCCH-ResourceList resource 0 is sufficient to carry the initial UCI payload (explicitly considering CRC bits). If reduction 225 implemented by processor 109 determines resource 0 is sufficient to carry the initial UCI payload, at 455, reduction 225 can determine that the second UCI payload can be the same as the initial UCI payload, which can be carried by PUCCH-CSI-ResourceList (with PF2/PF3 PRB number adjustment).

If reduction 225 implemented by processor 109 determines resource 0 is not sufficient to carry the initial UCI payload, at 456, reduction 225 implemented by processor 109 can determine whether multi-CSI-PUCCH-ResourceList resource 1 is sufficient to carry the initial UCI payload (explicitly considering CRC bits). If sufficient, at 457, reduction 225 implemented by processor 109 can determine that the second UCI payload can be the same as the initial UCI payload, which can be carried by PUCCH-CSI-ResourceList (with PF2/PF3 PRB number adjustment).

If reduction 225 determines resource 1 is not sufficient to carry the initial UCI payload, at 458, reduction 225 implemented by processor 109 can determine to use PUCCH-CSI-ResourceList (with PF2/PF3 PRB number adjustment), and further apply dropping and compaction rules, e.g., use CSI omission rules and HARQ compaction rules as described in FIGS. 4A-4D. In some examples, over-provision of PF2/PF3 may be used. Based on the over-provision of PF2/PF3, PRB #adjustment may be used.

Additional operations can be performed. To ensure that a base station receives the HARQ-ACK for uplink/downlink, transmission configuration indicator (TCI) state update may be performed for FR2 operation. In some examples, separate signaling can be used to protect some information, e.g. placing the HARQ-ACK on the more reliable bit in the encoding block.

Figure 5:
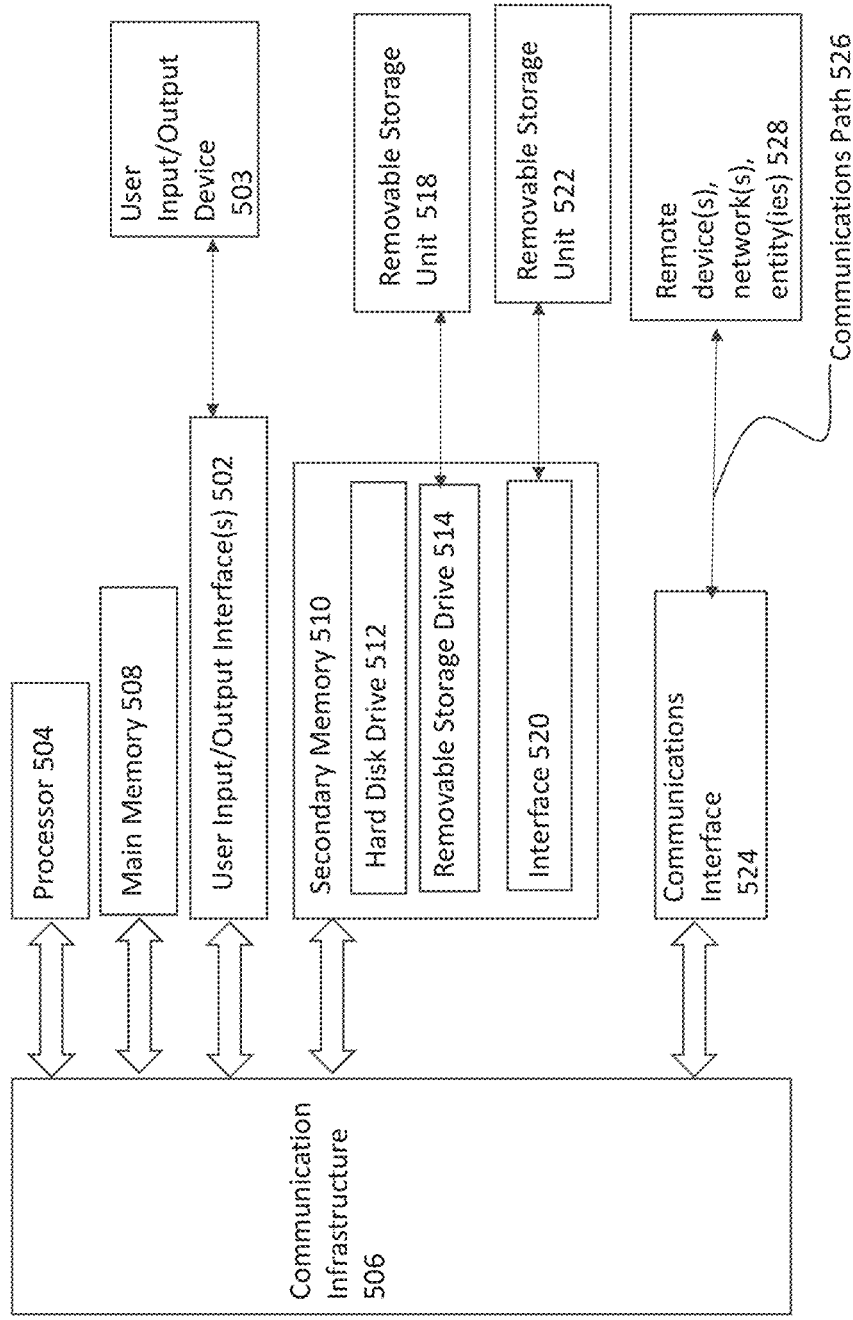
FIG. 5 is an example computer system for implementing some aspects or portion(s) thereof of the disclosure provided herein.

Various aspects can be implemented, for example, using one or more computer systems, such as computer system 500 shown in FIG. 5. Computer system 500 can be any computer capable of performing the functions described herein such as UE 101, base station 103, or base station 105 as shown in FIGS. 1A-1C and FIGS. 2A-2D. Computer system 500 includes one or more processors (also called central processing units, or CPUs), such as a processor 504. Processor 504 is connected to a communication infrastructure 506 (e.g., a bus). Computer system 500 also includes user input/output device(s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 508, the removable storage unit 518, the removable storage unit 522 can store instructions that, when executed by processor 504, cause processor 504 to perform operations for a UE or a base station, e.g., UE 101, base station 103, or base station 105 as shown in FIGS. 1A-1C and FIGS. 2A-2D. In some examples, the operations include those operations illustrated and described in FIG. 3 and FIGS. 4A-4E.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526. Operations of the communication interface 524 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth below in the example section.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:
a transceiver configured to enable wireless communication with a base station; and
a processor communicatively coupled to the transceiver and configured to:
multiplex at least a first Hybrid Automatic Repeat reQuest (HARQ) of a first priority and a second HARQ of a second priority to form an initial uplink control information (UCI) payload;
select a physical uplink control channel (PUCCH) resource accordingly to a PUCCH configuration;
generate a second UCI payload based on the initial UCI payload by removing or replacing at least a portion of the initial UCI payload when a size of the initial UCI payload is larger than a payload size of the PUCCH resource;
encode at least a portion of the second UCI payload including the first HARQ of the first priority to generate an error correction code word;
add the error correction code word to the second UCI payload to generate a transmission UCI payload; and
transmit, using the transceiver, the transmission UCI payload to the base station.

2. The UE of claim 1, wherein the PUCCH resource includes a PUCCH_ResourceSet triggered by a dynamic grant, a multi-CSI-PUCCH-ResourceList, or a PUCCH-CSI-ResourceList.

3. The UE of claim 1, wherein the second UCI payload is the initial UCI payload when the size of the initial UCI payload is smaller than or equal to the size of the PUCCH resource.

4. The UE of claim 1, wherein the encoded portion of the second UCI payload further includes the second HARQ of the second priority, wherein the first HARQ of the first priority and the second HARQ of the second priority are encoded jointly.

5. The UE of claim 1, wherein the encoded portion of the second UCI payload further includes the second HARQ of the second priority, wherein the first HARQ of the first priority and the second HARQ of the second priority are encoded separately.

6. The UE of claim 1, wherein the first HARQ of the first priority includes a high priority (HP) dynamic grant (DG) HARQ, a HP Semi-Persistent Scheduling (SPS) HARQ for a current slot, or a HP SPS HARQ for a deferred slot; and wherein the second HARQ of the second priority includes a low priority (LP) DG HARQ, a LP SPS HARQ for the current slot, or a LP SPS HARQ for the deferred slot.

7. The UE of claim 1, wherein the initial UCI payload further includes a UCI component, and the UCI component includes a channel state information (CSI), a scheduling request (SR), a high priority (HP) CSI, a HP persistent or semi-persistent (P/SP) CSI, a HP SR, a low priority (LP) CSI, a LP P/SP CSI, a LP SR, a CSI part 1, or a CSI part 2.

8. The UE of claim 1, wherein to generate the second UCI payload, the processor is further configured to remove or replace at least the portion of the initial UCI payload according to a pre-determined rule or a rule configured based on a configuration from the base station.

9. The UE of claim 1, wherein to generate the second UCI payload, the processor is further configured to remove a UCI component of the initial UCI payload when the size of the initial UCI payload is larger than the payload size of the PUCCH resource, remove a HARQ part for a component carrier, or remove the HARQ part of a lower priority while retaining the HARQ part of a higher priority, wherein the UCI component includes a channel state information (CSI), a scheduling request (SR), a high priority (HP) CSI, a HP persistent or semi-persistent (P/SP) CSI, a HP SR, a low priority (LP) CSI, a LP P/SP CSI, a LP SR, a CSI part 1, or a CSI part 2.

10. The UE of claim 1, wherein to generate the second UCI payload, the processor is further configured to remove a dynamic grant (DG) HARQ before removing a deferred Semi-Persistent Scheduling (SPS) HARQ, and to remove the deferred SPS HARQ before removing a current SPS HARQ; or to remove the deferred SPS HARQ before removing the DG HARQ, or to remove the DG HARQ before removing the current SPS HARQ, or to remove the current SPS HARQ before removing the DG HARQ.

11. The UE of claim 1, wherein to generate the second UCI payload, the processor is further configured replace a codeblock group (CBG) based HARQ by a transport block (TB) based HARQ.

12. The UE of claim 1, wherein to generate the second UCI payload, the processor is further configured to adjust the size of the PUCCH resource according to the size of the initial UCI payload.

13. A method for a user equipment (UE), comprising:
multiplexing at least a first Hybrid Automatic Repeat reQuest (HARQ) of a first priority and a second HARQ of a second priority to form an initial uplink control information (UCI) payload;
selecting a physical uplink control channel (PUCCH) resource accordingly to a PUCCH configuration;
generating a second UCI payload based on the initial UCI payload by removing or replacing at least a portion of the initial UCI payload when a size of the initial UCI payload is larger than a size of the PUCCH resource;
encoding at least a portion of the second UCI payload including the first HARQ of the first priority to generate an error correction code word;
adding the error correction code word to the second UCI payload to generate a transmission UCI payload; and
transmitting the transmission UCI payload to a base station.

14. The method of claim 13, wherein the PUCCH resource includes a PUCCH_ResourceSet triggered by a dynamic grant, a multi-CSI-PUCCH-ResourceList, or a PUCCH-CSI-ResourceList.

15. The method of claim 13, wherein the second UCI payload is the initial UCI payload when the size of the initial UCI payload is smaller than or equal to the size of the PUCCH resource.

16. The method of claim 13, wherein the encoded portion of the second UCI payload further includes the second HARQ of the second priority, wherein the first HARQ of the first priority and the second HARQ of the second priority are encoded jointly.

17. The method of claim 13, wherein the encoded portion of the second UCI payload further includes the second HARQ of the second priority, wherein the first HARQ of the first priority and the second HARQ of the second priority are encoded separately.

18. The method of claim 13, wherein the first HARQ of the first priority includes a high priority (HP) dynamic grant (DG) HARQ, a HP Semi-Persistent Scheduling (SPS) HARQ for a current slot, or a HP SPS HARQ for a deferred slot;
wherein the second HARQ of the second priority includes a low priority (LP) DG HARQ, a LP SPS HARQ for the current slot, or a LP SPS HARQ for the deferred slot; and
wherein the initial UCI payload further includes a UCI component that includes a channel state information (CSI), a scheduling request (SR), a high priority (HP) CSI, a HP persistent or semi-persistent (P/SP) CSI, a HP SR, a low priority (LP) CSI, a LP P/SP CSI, a LP SR, a CSI part 1, or a CSI part 2.

19. A non-transitory computer-readable medium storing instructions that, when executed by a processor of a user equipment (UE), cause the UE to perform operations, the operations comprising:
multiplexing at least a first Hybrid Automatic Repeat reQuest (HARQ) of a first priority and a second HARQ of a second priority to form an initial uplink control information (UCI) payload;
selecting a physical uplink control channel (PUCCH) resource accordingly to a PUCCH configuration;
generating a second UCI payload based on the initial UCI payload by removing or replacing at least a portion of the initial UCI payload when a size of the initial UCI payload is larger than a size of the PUCCH resource;
encoding at least a portion of the second UCI payload including the first HARQ of the first priority to generate an error correction code word;
adding the error correction code word to the second UCI payload to generate a transmission UCI payload; and
transmitting the transmission UCI payload to a base station.

20. The non-transitory computer-readable medium of claim 19,
wherein the first HARQ of the first priority includes a high priority (HP) dynamic grant (DG) HARQ, a HP Semi-Persistent Scheduling (SPS) HARQ for a current slot, or a HP SPS HARQ for a deferred slot;
wherein the second HARQ of the second priority includes a low priority (LP) DG HARQ, a LP SPS HARQ for the current slot, or a LP SPS HARQ for the deferred slot; and
wherein the initial UCI payload further includes a channel state information (CSI), a scheduling request (SR), a high priority (HP) CSI, a HP persistent or semi-persistent (P/SP) CSI, a HP SR, a low priority (LP) CSI, a LP P/SP CSI, a LP SR, a CSI part 1, or a CSI part 2; and
wherein CSI measurements performed during a current reference time period include a measurement for a parameter selected from a CSI reference signal (CSI-RS) resource indicator (CRI), a synchronization signal/physical broadcast channel (PBCH) block resource indicator (SSBRI), a layer 1 reference signal received power (L1-RSRP), a rank indicator (RI), a precoding matrix indicator (PMI), a layer indicator (LI), a channel quality indicator (CQI), or a signal to interference plus noise ratio (SINR).

* * * * *